US009114846B1

(12) United States Patent
Ishikawa et al.

(10) Patent No.: US 9,114,846 B1
(45) Date of Patent: Aug. 25, 2015

(54) VEHICLE HEIGHT ADJUSTMENT APPARATUS

(71) Applicant: Showa Corporation, Gyoda-shi (JP)

(72) Inventors: Fumiaki Ishikawa, Haga-gun (JP);
Takahiro Kasuga, Haga-gun (JP);
Yosuke Murakami, Fukuroi (JP);
Kimitoshi Sato, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/461,804

(22) Filed: Aug. 18, 2014

(30) Foreign Application Priority Data

Feb. 27, 2014 (JP) .................................. 2014-036448

(51) Int. Cl.
*B60G 17/056* (2006.01)
*B60G 17/015* (2006.01)
*B62K 25/28* (2006.01)
*B62K 25/04* (2006.01)

(52) U.S. Cl.
CPC ........... B62K 25/283 (2013.01); *B60G 2206/41* (2013.01); *B60G 2300/12* (2013.01); *B60G 2500/30* (2013.01); *B62K 2025/044* (2013.01); *B62K 2025/045* (2013.01); *B62K 2201/08* (2013.01); *Y10S 280/01* (2013.01)

(58) Field of Classification Search
CPC ...................... B60G 2500/30; B60G 2500/302;
B60G 2300/12; B60G 17/0525; B60G 17/015;
B60G 2600/26; B60G 15/062; B60G 2206/41;
Y10S 267/01; Y10S 267/02; Y10S 280/01;
B62K 2025/045; B62K 2025/044; B62K 25/283
USPC .............. 280/6.152, 6.15; 180/41; 267/64.17, 267/64.16; 701/37; 188/313, 314
See application file for complete search history.

(56) References Cited

U.S. PATENT DOCUMENTS

| 3,945,663 | A | * | 3/1976 | Duckett | 280/6.159 |
| 4,364,582 | A | * | 12/1982 | Takahashi et al. | 280/124.155 |
| 5,009,451 | A | * | 4/1991 | Hayashi et al. | 280/6.157 |
| 5,101,923 | A | * | 4/1992 | Odagi et al. | 180/219 |
| 5,211,420 | A | * | 5/1993 | Iwashita | 280/5.503 |
| 6,092,816 | A | * | 7/2000 | Sekine et al. | 280/6.159 |
| 6,494,441 | B2 | * | 12/2002 | Beck et al. | 267/64.16 |
| 2007/0029711 | A1 | * | 2/2007 | Ehara et al. | 267/64.28 |
| 2007/0227847 | A1 | * | 10/2007 | Nogami et al. | 188/322.21 |
| 2011/0227301 | A1 | * | 9/2011 | Nagai et al. | 280/6.157 |

FOREIGN PATENT DOCUMENTS

| JP | 08-022680 B | 3/1996 |
| JP | 2014-094602 A | 5/2014 |

OTHER PUBLICATIONS

U.S. Appl. No. 14/226,065, filed Mar. 26, 2014, Showa Corporation.

* cited by examiner

*Primary Examiner* — Keith Frisby
(74) *Attorney, Agent, or Firm* — Leason Ellis LLP

(57) ABSTRACT

A vehicle height adjustment apparatus includes a rear wheel suspension spring that is disposed between a vehicle body and a tire wheel of a vehicle; a rear wheel damper that undergoes an extensional and contractional operation so as to move working oil to dampen vibration of the spring; a support member that supports one end portion of the spring, and moves relative to the damper to change the length of the spring; a jack chamber into which the working oil causing the support member to move relative to the damper flows by the extensional and contractional operation of the damper; a rear wheel electromagnetic valve that adjusts the amount of the working oil flowing into the jack chamber by the degree of opening of the electromagnetic valve; and control device that controls the degree of opening of the electromagnetic valve based on a weight exerted on the vehicle.

2 Claims, 16 Drawing Sheets

FIG. 3A
COMPRESSION PROCESS
FIG. 3B
EXTENSIONAL PROCESS
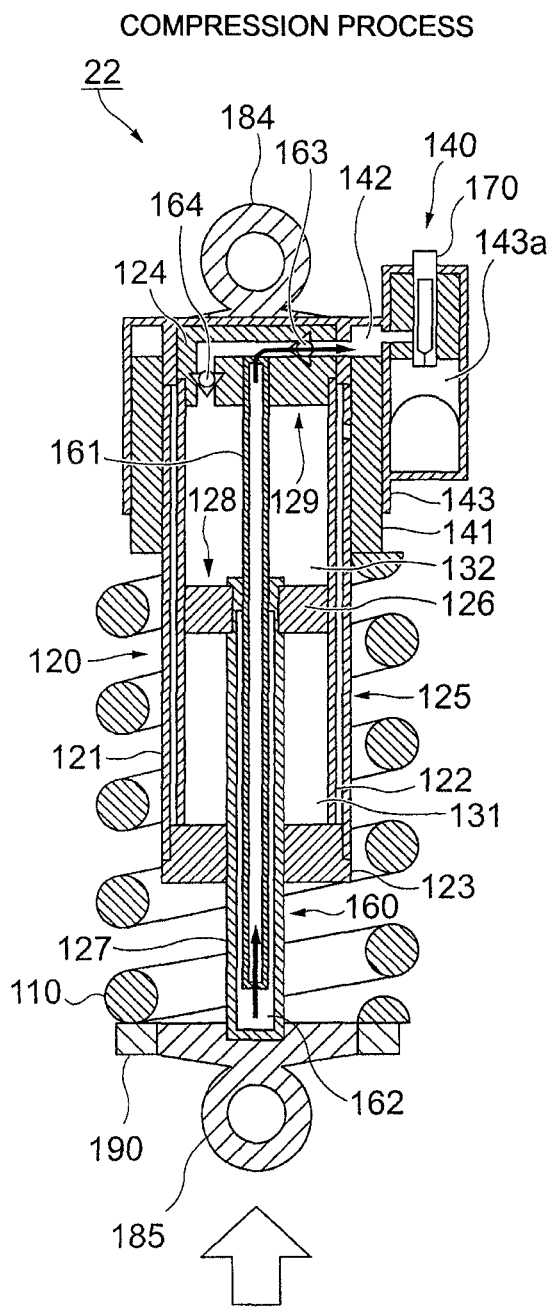
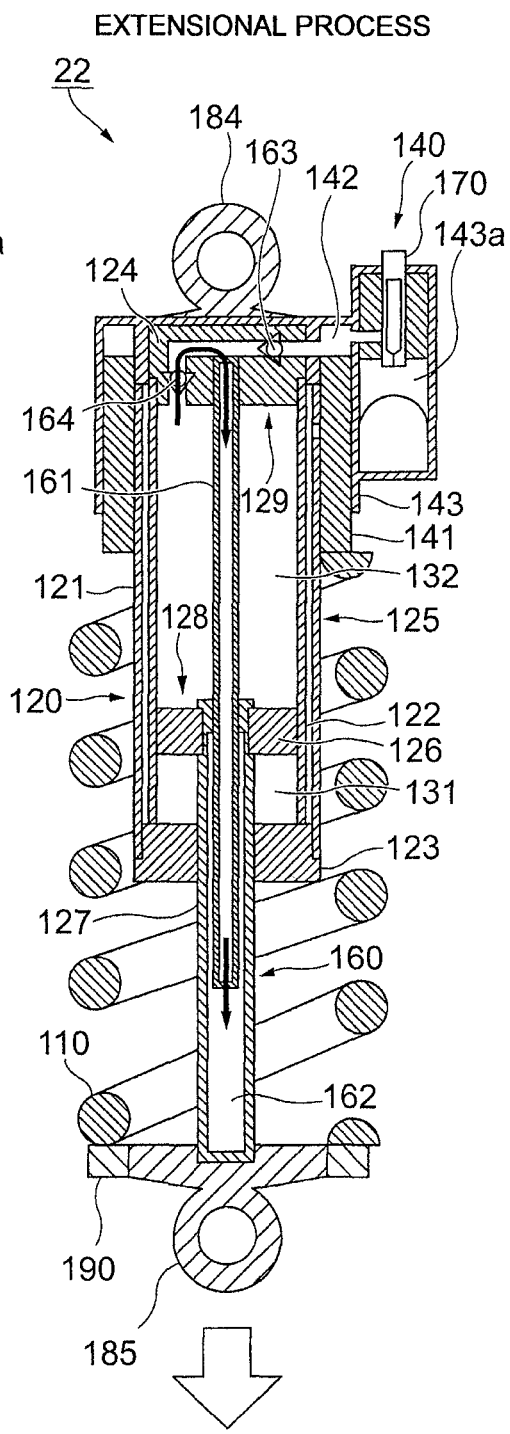

FIG. 4A
FIG. 4B
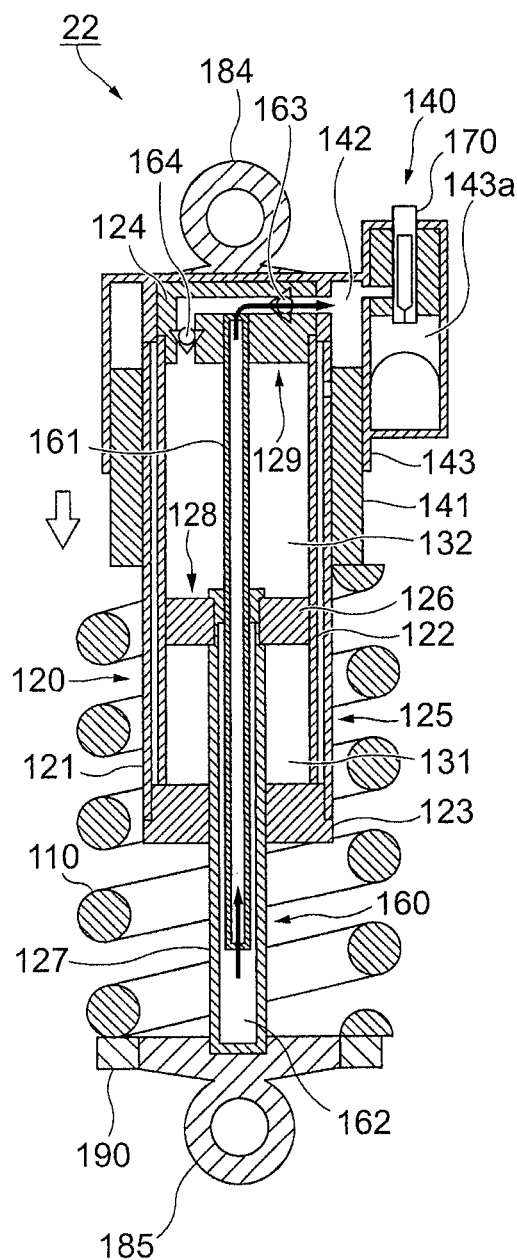
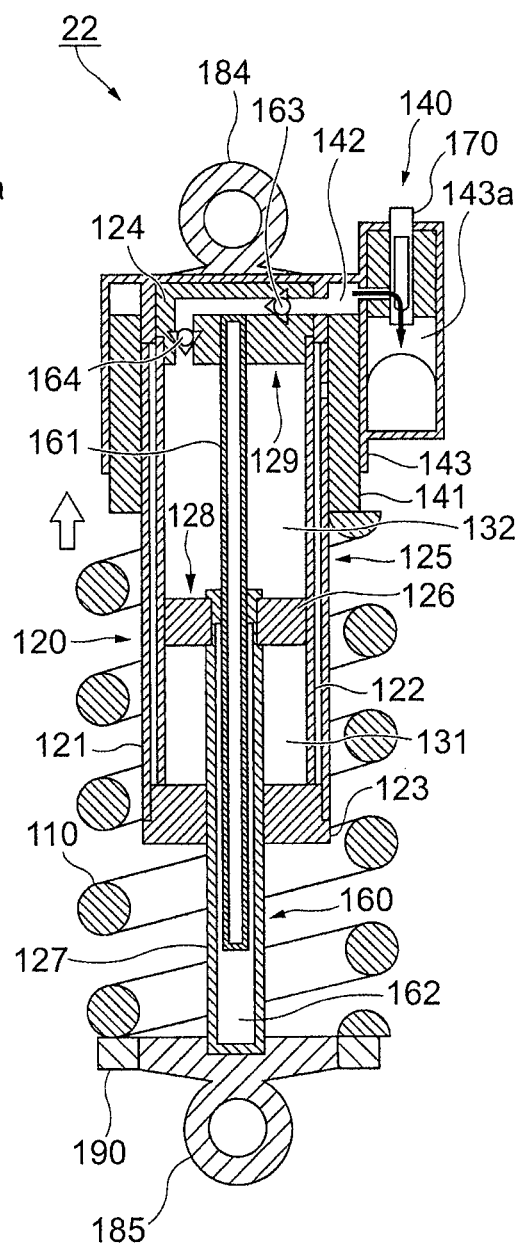

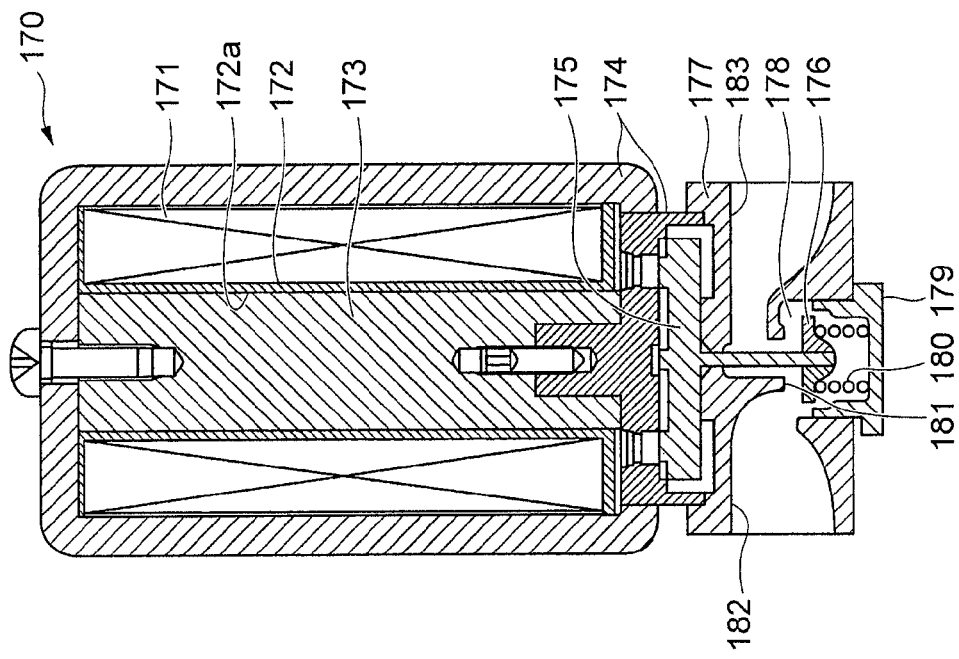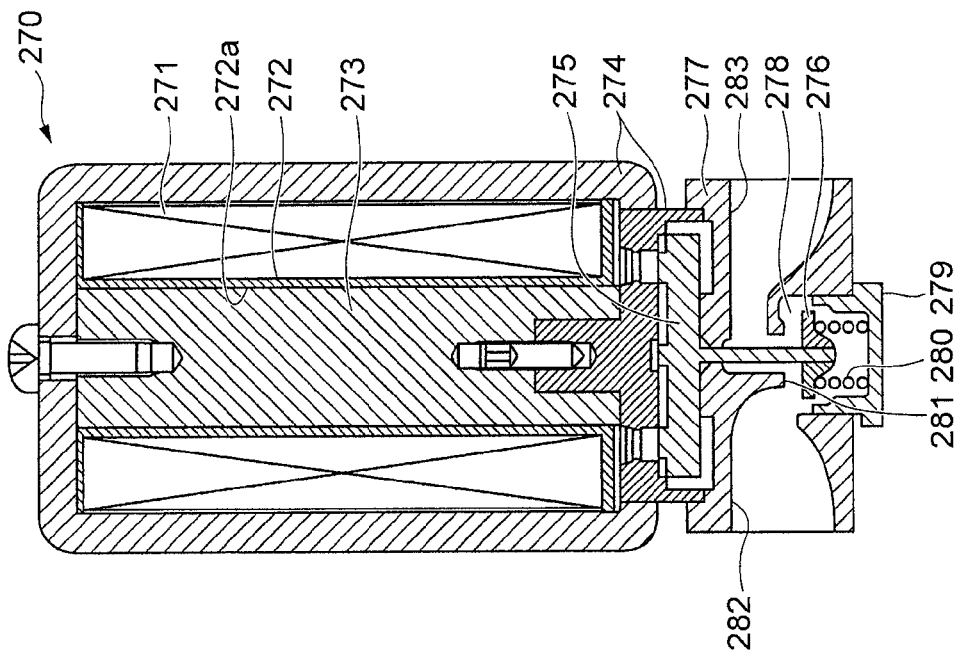

VEHICLE HEIGHT ADJUSTMENT APPARATUS

CROSS-REFERENCE TO RELATED APPLICATIONS

This application is based on and claims priority under 35 USC 119 from Japanese Patent Application No. 2014-036448 filed on Feb. 27, 2014, the entire content of which is incorporated herein by reference.

BACKGROUND OF THE INVENTION

1. Field of the Invention

The present invention relates to a vehicle height adjustment apparatus that adjusts a vehicle height of a motorcycle.

2. Description of Related Art

In recent years, an apparatus is proposed which increases the vehicle height of a motorcycle while the motorcycle is travelling, and decreases the vehicle height in order for an occupant to easily get on and off the motorcycle at a stop.

For example, a vehicle height adjustment apparatus disclosed in JP-B-H08-22680 has the following configuration. That is, a rear arm is pivotably supported by a rear portion of a vehicle frame of the motorcycle, and a rear wheel is supported in a rear end of the rear arm via a vehicle axle. A hydraulic shock absorbing apparatus is disposed between the rear arm and the vehicle frame via a link mechanism. The hydraulic shock absorbing apparatus has a hydraulic attenuator and a shock absorbing spring. A lid is fitted into a cylinder head aperture, and also functions as a bracket for attachment of a cylinder. A support tube is fixed to the lid while being freely fitted in the circumference of the cylinder. A cylindrical spring seat is inserted in a fitting yet slidable manner into the cylinder and the support tube. The spring seat is intended to support the shock absorbing spring on the opposite side of a bracket of a piston rod. A working oil chamber is formed on an inner side of the support tube. The vehicle height adjustment apparatus pushes the spring seat downwardly against the shock absorbing spring, and extends an oil pressure attenuator by changing the oil pressure of the working oil chamber. Accordingly, a gap between the rear arm and the frame is increased, and thus the vehicle height is increased.

SUMMARY OF THE INVENTION

In an apparatus that adjusts a vehicle height by changing an initial length of a spring and thus an initial load, the vehicle height is changed by a weight exerted on a vehicle such as the weight of an occupant or the weight of luggage. For example, when the weight exerted on the vehicle is greater than an assumed weight, the vehicle height becomes lower than a desired height. When the weight exerted on the vehicle is less than the assumed weight, the vehicle height becomes higher than the desired height. In particular, since the vehicle height affects ride comfort or travelling stability while the vehicle is travelling, obtaining the desired height regardless of the weight exerted on the vehicle is desired.

An object of the present invention is to provide a vehicle height adjustment apparatus that can adjust a vehicle height to a desired height regardless of a weight exerted on a vehicle.

A vehicle height adjustment apparatus according to an aspect of the present invention includes a spring that is disposed between a vehicle body and a tire wheel of a vehicle; a damper that undergoes an extensional and contractional operation so as to move working oil to dampen vibration of the spring; a support member that supports one end portion of the spring, and moves relative to the damper to change the length of the spring; a working oil chamber into which the working oil causing the support member to move relative to the damper flows by the extensional and contractional operation of the damper; an electromagnetic valve that adjusts the amount of the working oil flowing into the working oil chamber by the degree of opening of the electromagnetic valve; and a control unit that controls the degree of opening of the electromagnetic valve based on a weight exerted on the vehicle.

Here, the control unit may change upper and lower limits of the amount of working oil flowing into the working oil chamber based on the weight exerted on the vehicle.

According to the present invention, it is possible to provide the vehicle height adjustment apparatus that can adjust the vehicle height to a desired height regardless of the weight exerted on the vehicle.

BRIEF DESCRIPTION OF THE DRAWINGS

FIGS. 3A and 3B are views describing an operation of a rear wheel liquid supply device.

FIGS. 4A and 4B are views describing adjustment of a vehicle height by a rear wheel relative position changing device.

FIG. 10A is a view illustrating a schematic configuration of a front wheel electromagnetic valve, and FIG. 10B is a view illustrating a schematic configuration of a rear wheel electromagnetic valve.

DETAILED DESCRIPTION OF THE INVENTION

Hereinafter, embodiments of the present invention will be described with reference to the accompanying drawings.

Figure 1:
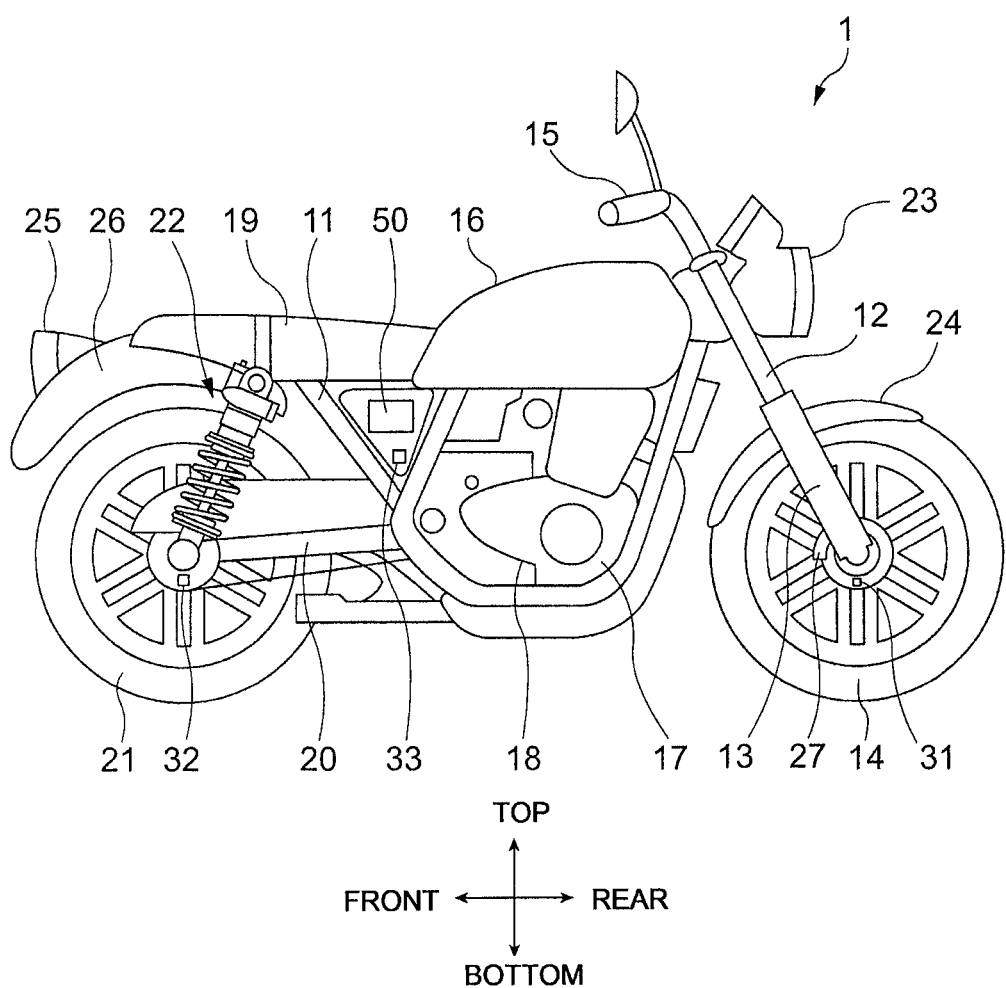
FIG. 1 is a view illustrating a schematic configuration of a motorcycle according to an embodiment.

FIG. 1 is a view illustrating a schematic configuration of a motorcycle 1 according to an embodiment.

As illustrated in FIG. 1, the motorcycle 1 has a vehicle frame 11; a head pipe 12 that is attached to a front end portion of the vehicle frame 11; two front forks 13 that are provided in the head pipe 12; and a front wheel 14 that is attached to lower ends of the two front forks 13. The two front forks 13 are respectively disposed on right and left sides of the front wheel 14. FIG. 1 illustrates only the front fork 13 that is disposed on the right side. A specific configuration of the front fork 13 will be described later.

The motorcycle 1 has a handlebar 15 that is attached to upper portions of the front forks 13; a fuel tank 16 that is attached to a front upper portion of the vehicle frame 11; and an engine 17 and a transmission 18 which are disposed below the fuel tank 16.

The motorcycle 1 has a seat 19 that is attached to a rear upper portion of the vehicle frame 11; a swing arm 20 that is swingably attached to a lower portion of the vehicle frame 11; a rear wheel 21 that is attached to a rear end of the swing arm 207 and one or two rear suspensions 22 that are attached between a rear portion (the rear wheel 21) of the swing arm 20 and a rear portion of the vehicle frame 11. The one or the two rear suspensions 22 are respectively disposed on right and left sides of the rear wheel 21. FIG. 1 illustrates only the rear suspension 22 that is disposed on the right side. A specific configuration of the rear suspension 22 will be described later.

The motorcycle 1 has ahead lamp 23 that is disposed in front of the head pipe 12; a front fender 24 that is attached to the front forks 13 so as to cover an upper portion of the front wheel 14; a tail lamp 25 that is disposed in the back of the seat 19; and a rear fender 26 that is attached below the tail lamp 25 so as to cover an upper portion of the rear wheel 21. The motorcycle 1 has a brake 27 for stopping the rotation of the front wheel 14.

The motorcycle 1 has a front wheel rotation detection sensor 31 that detects a rotation angle of the front wheel 14, and a rear wheel rotation detection sensor 32 that detects a rotation angle of the rear wheel 21. The motorcycle 1 has a load detection sensor 33 that detects a load exerted on the front wheel 14 and the rear wheel 21 from the vehicle frame 11 when an occupant gets on or luggage is mounted on the seat 19 and the like.

The motorcycle 1 includes a control device 50 as an example of the control unit that controls the degree of opening of a front wheel electromagnetic valve 270 of the front fork 13, which will be describe later and the degree of opening of a rear wheel electromagnetic valve 170 of the rear suspension 22, which will be described later. The control device 50 controls a vehicle height of the motorcycle 1 by controlling the degree of opening of the front wheel electromagnetic valve 270 and the rear wheel electromagnetic valve 170 which will be described later. The control device 50 receives signals output from the front wheel rotation detection sensor 31, the rear wheel rotation detection sensor 32, the load detection sensor 33, and the like.

Subsequently, the rear suspension 22 will be described.

Figure 2:
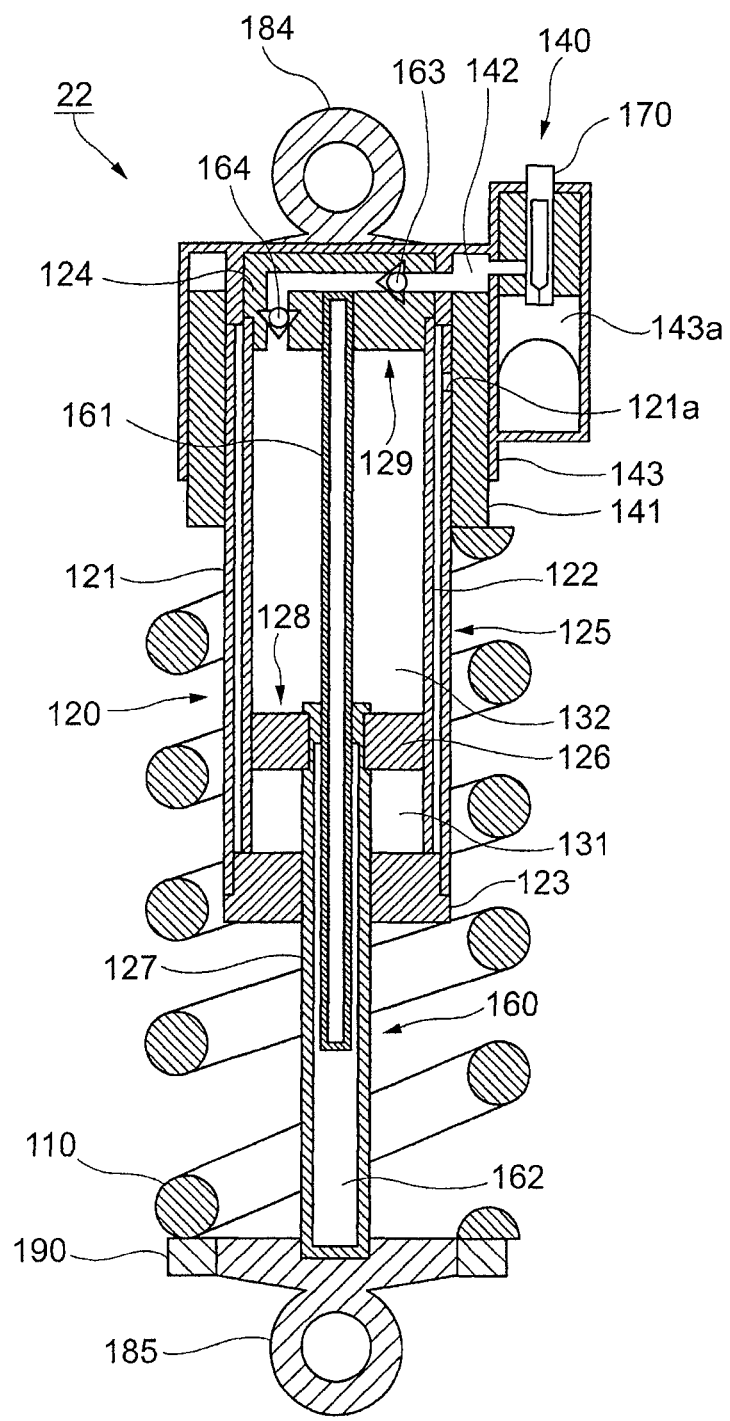
FIG. 2 is a cross-sectional view of a rear suspension.

FIG. 2 is a cross-sectional view of the rear suspension 22.

The rear suspension 22 is attached between the vehicle frame 11 as an example of a vehicle body and the rear wheel 21 of the motorcycle 1. The rear suspension 22 includes a rear wheel suspension spring 110 as an example of a spring that supports the weight of the motorcycle 1, and absorbs an impact, and a rear wheel damper 120 as an example of a damper that dampens vibration of the rear wheel suspension spring 110. The rear suspension 22 includes a rear wheel relative position changing device 140 that can change a rear wheel relative position indicating a relative position between the vehicle frame 11 and the rear wheel 21 by adjusting the spring force of the rear wheel suspension spring 110, and a rear wheel liquid supply device 160 that supplies liquid to the rear wheel relative position changing device 140. The rear suspension 22 includes a vehicle body side attachment member 184 through which the rear suspension 22 is attached to the vehicle frame 11; a vehicle axle-side attachment member 185 through which the rear suspension 22 is attached to the rear wheel 21; and a spring receiver 190 that is attached to the vehicle axle-side attachment member 185 so as to support one end portion (a lower portion in FIG. 2) of the rear wheel suspension spring 110 in a centerline direction. The rear suspension 22 functions as an example of change means that can change a relative position between the vehicle frame 11 and the rear wheel 21 as an example of a tire wheel, and as an example of rear wheel-side change means.

As illustrated in FIG. 2, the rear wheel damper 120 includes a cylinder 125 having a thin-wall cylindrical outer cylinder 121; a thin-wall cylindrical inner cylinder 122 that is accommodated in the outer cylinder 121; a bottom cover 123 that blocks one end portion (a lower portion in FIG. 2) of the cylindrical outer cylinder 121 in a centerline direction (in the vertical direction in FIG. 2) of the outer cylinder 121; and an upper cover 124 that blocks one end portion (an upper portion in FIG. 2) of the inner cylinder 122 in the centerline direction. Hereinafter, the centerline direction of the outer cylinder 121 is simply referred to as the "centerline direction".

The rear wheel damper 120 includes a piston 126 that is inserted into the inner cylinder 122 so as to be movable in the centerline direction, and a piston rod 127 that extends in the centerline direction, and supports the piston 126 by one end portion (an upper end portion in FIG. 2) of the piston rod 127 in the centerline direction. The piston 126 is in contact with an inner circumferential surface of the inner cylinder 122, and divides a liquid (oil in the embodiment) sealed space in the cylinder 125 into a first oil chamber 131 and a second oil chamber 132. The first oil chamber 131 is positioned on one end side of the piston 126 in the centerline direction, and the second oil chamber 132 is positioned on the other end side of the piston 126 in the centerline direction. The piston rod 127 is a cylindrical member, and a pipe 161 to be described later is inserted into the piston rod 127. In the embodiment, oil functions as an example of working oil.

The rear wheel damper 120 includes a first damping force generating apparatus 128 that is disposed in one end portion of the piston rod 127 in the centerline direction, and a second damping force generating apparatus 129 that is disposed in the other end portion of the inner cylinder 122 in the centerline direction. The first damping force generating apparatus 128 and the second damping force generating apparatus 129 dampen extensional and contractional vibration of the cylinder 125 and the piston rod 127, which is occurring when the rear wheel suspension spring 110 absorbs an impact force from a road surface. The first damping force generating apparatus 128 is disposed to function as a connection path between the first oil chamber 131 and the second oil chamber 132. The second damping force generating apparatus 129 is disposed to function as a connection path between the second oil chamber 132 and a jack chamber 142 of the rear wheel relative position changing device 140, which will be described later.

The rear wheel liquid supply device 160 undergoes a pumping operation by an extensional and contractional movement of the piston rod 127 relative to the cylinder 125 so that the rear wheel liquid supply device 160 supplies liquid into the jack chamber 142 of the rear wheel relative position changing device 140, which will be described later.

The rear wheel liquid supply device 160 has the cylindrical pipe 161 that is fixed to the cover 124 of the rear wheel damper 120 so as to extend in the centerline direction. The pipe 161 is coaxially inserted into a pump chamber 162 which is an inner portion of the cylindrical piston rod 127.

The rear wheel liquid supply device 160 has a discharge check valve 163 and a suction check valve 164. When the piston rod 127 moves to enter the cylinder 125 and the pipe 161, liquid in the pump chamber 162 is pressurized and discharged into the jack chamber 142, which will be described later, via the discharge check valve 163. When the piston rod 127 moves to retract from the cylinder 125 and the pipe 161, a pressure of the pump chamber 162 becomes negative, and liquid in the cylinder 125 is suctioned into the pump chamber 162 via the suction check valve 164.

FIGS. 3A and 3B are views describing an operation of the rear wheel liquid supply device 160.

When the rear suspension 22 receives a force caused by concave and convex road surfaces while the motorcycle 1 is travelling, the rear wheel liquid supply device 160 with the aforementioned configuration undergoes a pumping operation by an extensional and contractional movement in which the piston rod 127 enters and retracts from the cylinder 125 and the pipe 161. When the pump chamber 162 is pressured by the pumping operation, the discharge check valve 163 is opened by liquid in the pump chamber 162, and the liquid is discharged into the jack chamber 142 of the rear wheel relative position changing device 140 (refer to FIG. 3A). When a pressure of the pump chamber 162 becomes negative by the pumping operation, the suction check valve 164 is opened by liquid in the second oil chamber 132 of the cylinder 125, and the liquid is suctioned into the pump chamber 162 (refer to FIG. 3B).

The rear wheel relative position changing device 140 has a support member 141 that is disposed to cover an outer circumference of the cylinder 125 of the rear wheel damper 120, and supports the other end portion (an upper portion in FIGS. 3A and 3B) of the rear wheel suspension spring 110 in the centerline direction. The rear wheel relative position changing device 140 also has a hydraulic jack 143 that is disposed to cover an outer circumference of one end portion (an upper portion in FIGS. 3A and 3B) of the cylinder 125 in the centerline direction, and forms the jack chamber 142 along with the support member 141. When the jack chamber 142 as an example of a working oil chamber is filled with liquid from the cylinder 125, or when liquid is discharged from the jack chamber 142, the support member 141 moves relative to the hydraulic jack 143 in the centerline direction. The vehicle body side attachment member 184 is attached to an upper portion of the hydraulic jack 143, and the support member 141 moves relative to the hydraulic jack 143 in the centerline direction. Accordingly, the spring force of the rear wheel suspension spring 110 changes, thereby changing a position of the seat 19 relative to the rear wheel 21.

The rear wheel relative position changing device 140 has a rear wheel electromagnetic valve 170 which is an electromagnetic valve (a solenoid valve) provided in a fluid flow path between the jack chamber 142 and a liquid reservoir chamber 143*a* formed in the hydraulic jack 143. When the rear wheel electromagnetic valve 170 is closed, liquid supplied into the jack chamber 142 is reserved in the jack chamber 142. When the rear wheel electromagnetic valve 170 is open, the liquid supplied into the jack chamber 142 is discharged into the liquid reservoir chamber 143*a* formed in the hydraulic jack 143. The rear wheel electromagnetic valve 170 will be described in detail later. The liquid discharged into the liquid reservoir chamber 143*a* returns into the cylinder 125.

FIGS. 4A and 4B are views describing adjustment of a vehicle height by the rear wheel relative position changing device 140.

When the rear wheel liquid supply device 160 supplies liquid into the jack chamber 142 in a state in which the rear wheel electromagnetic valve 170 is even a little closed from a fully open state, the jack chamber 142 is filled with the liquid, the support member 141 moves toward one end portion (a lower portion in FIG. 4A) of the hydraulic jack 143 in the centerline direction, and the spring length of the rear wheel suspension spring 110 becomes shortened (refer to FIG. 4A). In contrast, when the rear wheel electromagnetic valve 170 is fully open, the liquid in the jack chamber 142 is discharged into the liquid reservoir chamber 143*a*, the support member 141 moves toward the other end portion (an upper portion in FIG. 4B) of the hydraulic jack 143 in the centerline direction, and the spring length of the rear wheel suspension spring 110 becomes lengthened (refer to FIG. 4B).

When the support member 141 moves relative to the hydraulic jack 143, and thus the spring length of the rear wheel suspension spring 110 becomes shortened, the spring force of the rear wheel suspension spring 110 to press the support member 141 increases further compared to when the support member 141 does not move relative to the hydraulic jack 143. As a result, even when a force is exerted toward the rear wheel 21 from the vehicle frame 11, an initial load changes, at which a relative position between the rear wheel 21 and the vehicle frame 11 does not change. At this time, when the same force is exerted from the vehicle frame 11 (the seat 19) toward one end portion (lower portions in FIGS. 4A and 4B) of the rear suspension 22 in the centerline direction, the amount of compression (a change in distance between the vehicle body side attachment member 184 and the vehicle axle-side attachment member 185) of the rear suspension 22 decreases. When the support member 141 moves relative to the hydraulic jack 143, and thus the spring length of the rear wheel suspension spring 110 becomes shortened, the height of the seat 19 is increased (the vehicle height is increased) further compared to when the support member 141 does not move relative to the hydraulic jack 143. That is, the degree of opening of the rear wheel electromagnetic valve 170 decreases, and thus the vehicle height is increased.

In contrast, when the support member 141 moves relative to the hydraulic jack 143, and thus the spring length of the rear wheel suspension spring 110 becomes lengthened, the spring force of the rear wheel suspension spring 110 to press the support member 141 decreases further compared to when the support member 141 does not move relative to the hydraulic jack 143. At this time, when the same force is exerted from the vehicle frame 11 (the seat 19) toward one end portion (the lower portions in FIGS. 4A and 4B) of the rear suspension 22 in the centerline direction, the amount of compression (a change in distance between the vehicle body side attachment member 184 and the vehicle axle-side attachment member 185) of the rear suspension 22 increases. When the support member 141 moves relative to the hydraulic jack 143, and thus the spring length of the rear wheel suspension spring 110 becomes lengthened, the height of the seat 19 decreases (the vehicle height decreases) further compared to when the support member 141 does not move relative to the hydraulic jack 143. That is, the vehicle height decreases to the extent that the degree of opening of the rear wheel electromagnetic valve 170 increases.

The degree of opening of the rear wheel electromagnetic valve 170 is controlled by the control device 50.

When the rear wheel electromagnetic valve 170 is open, liquid supplied into the jack chamber 142 may be discharged into the first oil chamber 131 and/or the second oil chamber 132 of the cylinder 125.

As illustrated in FIG. 2, a return path 121a is provided in the outer cylinder 121 of the cylinder 125. When the support member 141 moves to a predetermined limit position toward one end portion (the lower portion in FIG. 2) of the hydraulic jack 143 in the centerline direction, liquid in the jack chamber 142 returns into the cylinder 125 via the return path 121a.

Figure 5:
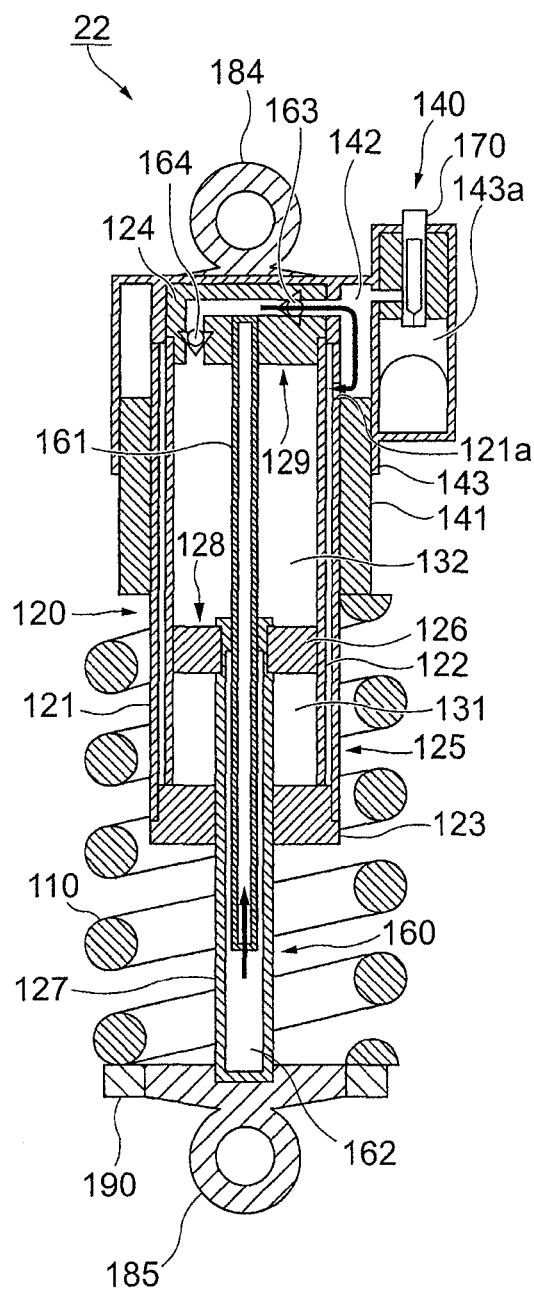
FIG. 5 is a view illustrating a mechanism in which the vehicle height is maintained.

FIG. 5 is a view illustrating a mechanism in which the vehicle height is maintained.

When the rear wheel electromagnetic valve 170 is fully closed, and liquid is continuously supplied into the jack chamber 142, the supplied liquid returns into the cylinder 125 via the return path 121a. Accordingly, the position of the support member 141 is maintained relative to the hydraulic jack 143, and the height of the seat 19 (the vehicle height) is maintained.

Hereinafter, when the rear wheel electromagnetic valve 170 is fully open, and the amount of movement of the support member 141 relative to the hydraulic jack 143 is the minimum (zero), the state of the rear suspension 22 is referred to as a minimum state. When the rear wheel electromagnetic valve 170 is fully closed, and the amount of movement of the support member 141 relative to the hydraulic jack 143 is the maximum, the state of the rear suspension 22 is referred to as a maximum state.

Figure 11:
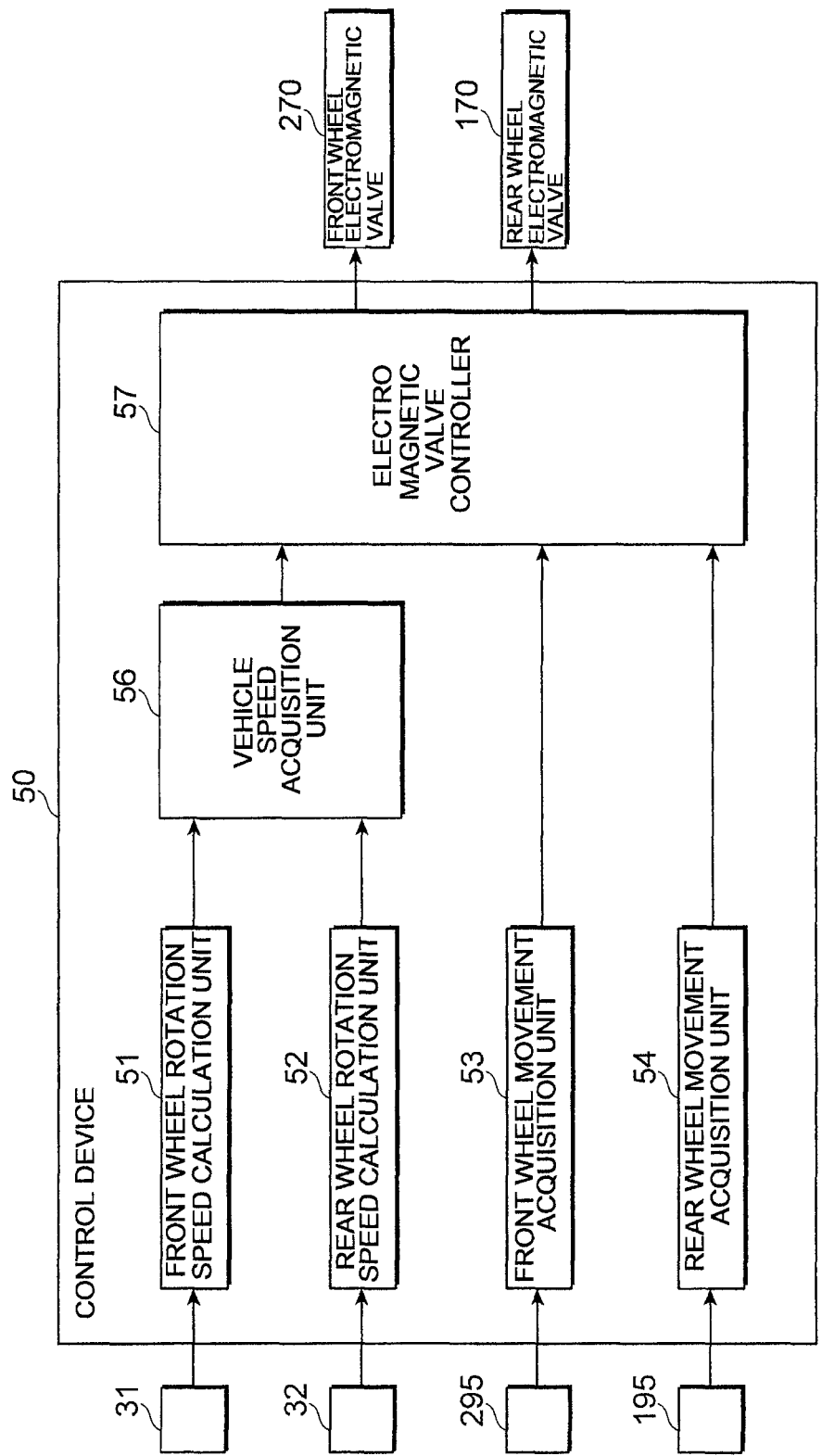
FIG. 11 is a block diagram of a control device.

The rear suspension 22 has a rear wheel relative position detection unit 195 (refer to FIG. 11). The rear wheel relative position detection unit 195 can detect the amount of movement of the support member 141 relative to the hydraulic jack 143 in the centerline direction, or in other words, the amount of movement of the support member 141 relative to the vehicle body side attachment member 184 in the centerline direction. Specifically, coils are wound around an outer circumferential surface of the support member 141, and the hydraulic jack 143 is formed of a magnetic body. The rear wheel relative position detection unit 195 can detect the amount of movement of the support member 141 based on impedance of the coils, which changes according to the movement of the support member 141 relative to the hydraulic jack 143 in the centerline direction.

Subsequently, the front fork 13 will be described in detail.

Figure 6:
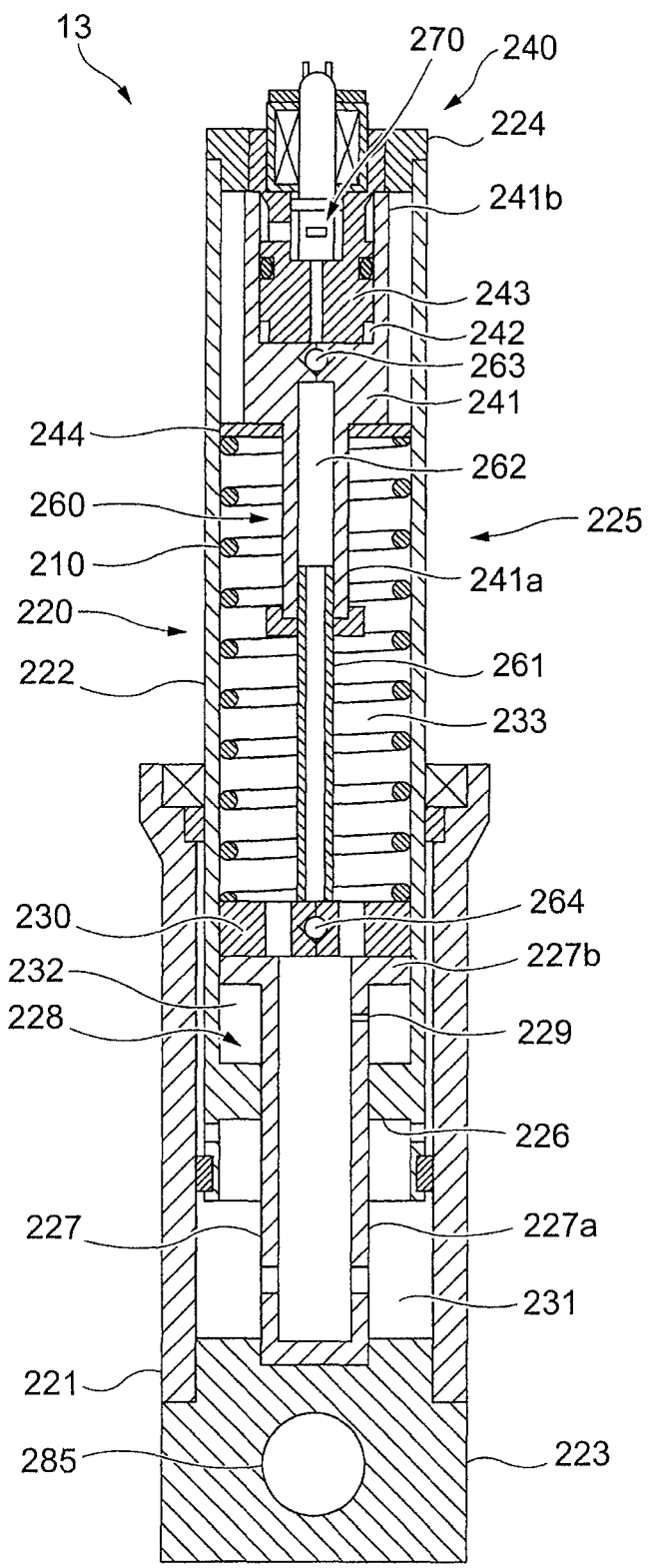
FIG. 6 is a cross-sectional view of a front fork.

FIG. 6 is a cross-sectional view of the front fork 13.

The front fork 13 is attached between the vehicle frame 11 and the front wheel 14. The front fork 13 includes a front wheel suspension spring 210 that supports the weight of the motorcycle 1, and absorbs an impact, and a front wheel damper 220 that dampens vibration of the front wheel suspension spring 210. The front fork 13 includes a front wheel relative position changing device 240 that can change a front wheel relative position indicating a relative position between the vehicle frame 11 and the front wheel 14 by adjusting the spring force of the front wheel suspension spring 210, and a front wheel liquid supply device 260 that supplies liquid to the front wheel relative position changing device 240. The front fork 13 includes a vehicle axle-side attachment portion 285 and a head pipe-side attachment portion (not illustrated). The front fork 13 is attached to the front wheel 14 via the vehicle axle-side attachment portion 285, and the front fork 13 is attached to the head pipe 12 via the head pipe-side attachment portion. The front fork 13 functions as an example of the change means that changes a relative position between the vehicle frame 11 and the front wheel 14. The front fork 13 functions as an example of the change means that can change a relative position between the vehicle frame 11 and the front wheel 14 as an example of the tire wheel, and as an example of front wheel-side change means.

As illustrated in FIG. 6, the front wheel damper 220 includes a cylinder 225 having a thin-wall cylindrical outer cylinder 221; a thin-wall cylindrical inner cylinder 222, one end portion (a lower portion in FIG. 6) of which is inserted into the cylindrical outer cylinder 221 via one end portion (an upper portion in FIG. 6) of the outer cylinder 221 in a centerline direction (in the vertical direction in FIG. 6); a bottom cover 223 that blocks the other end portion (a lower portion in FIG. 6) of the outer cylinder 221 in the centerline direction; and an upper cover 224 that blocks the other end portion (an upper portion in FIG. 6) of the inner cylinder 222 in the centerline direction. The inner cylinder 222 is slidably inserted into the outer cylinder 221.

The front wheel damper 220 includes a piston rod 227 that is attached to the bottom cover 223 so as to extend in the centerline direction. The piston rod 227 has a cylindrical portion 227a that extends in the centerline direction, and a disc-shaped flange portion 227b that is provided in one end portion (an upper portion in FIG. 6) of the cylindrical portion 227a in the centerline direction.

The front wheel damper 220 is fixed to one end portion (the lower portion in FIG. 6) of the inner cylinder 222 in the centerline direction, and includes a piston 226 that is slidable relative to an outer circumference of the cylindrical portion 227a of the piston rod 227. The piston 226 is in contact with an outer circumferential surface of the cylindrical portion 227a of the piston rod 227, and divides a liquid (oil in the embodiment) sealed space in the cylinder 225 into a first oil chamber 231 and a second oil chamber 232. The first oil chamber 231 is positioned on one end side of the piston 226 in the centerline direction, and the second oil chamber 232 is positioned on the other end side of the piston 226 in the centerline direction. In the embodiment, oil functions as an example of working oil.

The front wheel damper 220 includes a cover member 230 that is provided above the piston rod 227 so as to cover an aperture of the cylindrical portion 227a of the piston rod 227. The cover member 230 supports one end portion (a lower portion in FIG. 6) of the front wheel suspension spring 210 in the centerline direction. The front wheel damper 220 has an oil reservoir chamber 233 including a space that is formed in the inner cylinder 222 on one end side of the cover member 230 in the centerline direction, and a space that is formed in the cylindrical portion 227a of the piston rod 227. The oil reservoir chamber 233 communicates with the first oil chamber 231 and the second oil chamber 232 all the time.

The front wheel damper 220 includes a first dampening force generation portion 228 that is provided in the piston 226, and a second dampening force generation portion 229 that is formed in the piston rod 227. The first dampening force generation portion 228 and the second dampening force generation portion 229 dampen extensional and contractional vibration of the inner cylinder 222 and the piston rod 227, which is occurring when the front wheel suspension spring 210 absorbs an impact force from a road surface. The first dampening force generation portion 228 is disposed to function as a connection path between the first oil chamber 231 and the second oil chamber 232. The second dampening force generation portion 229 is formed to function as a connection path between the first oil chamber 231, the second oil chamber 232 and the oil reservoir chamber 233.

The front wheel liquid supply device 260 undergoes a pumping operation by an extensional and contractional movement of the piston rod 227 relative to the inner cylinder 222 so that the front wheel liquid supply device 260 supplies liquid into a jack chamber 242 of the front wheel relative position changing device 240, which will be described later.

The front wheel liquid supply device 260 has a cylindrical pipe 261 that is fixed to the cover member 230 of the front wheel damper 220 so as to extend in the centerline direction. The pipe 261 is coaxially inserted into a pump chamber 262 which is an inner portion of a lower cylindrical portion 241$a$ of a support member 241 of the front wheel relative position changing device 240, which will be described later.

The front wheel liquid supply device 260 has a discharge check valve 263 and a suction check valve 264. When the piston rod 227 moves to enter the inner cylinder 222, liquid in the pump chamber 262 is pressurized and discharged into the jack chamber 242, which will be described later, via the discharge check valve 263. When the piston rod 227 moves to retract from the inner cylinder 222, a pressure of the pump chamber 262 becomes negative, and liquid in the oil reservoir chamber 233 is suctioned into the pump chamber 262 via the suction check valve 264.

Figure 7A:
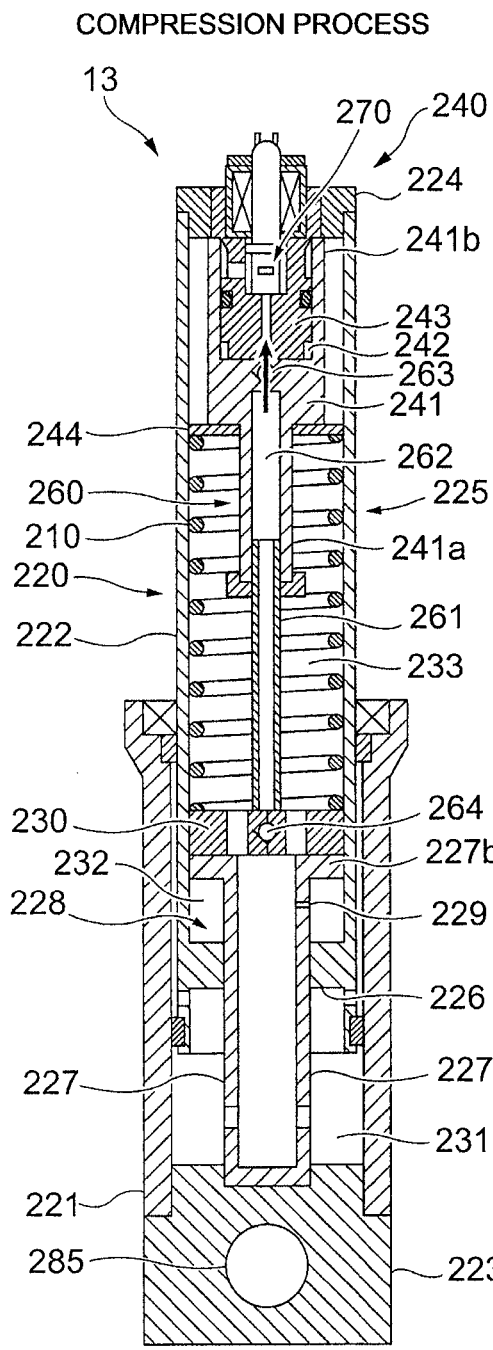
FIGS. 7A and 7B are views describing an operation of a front wheel liquid supply device.
Figure 7B:
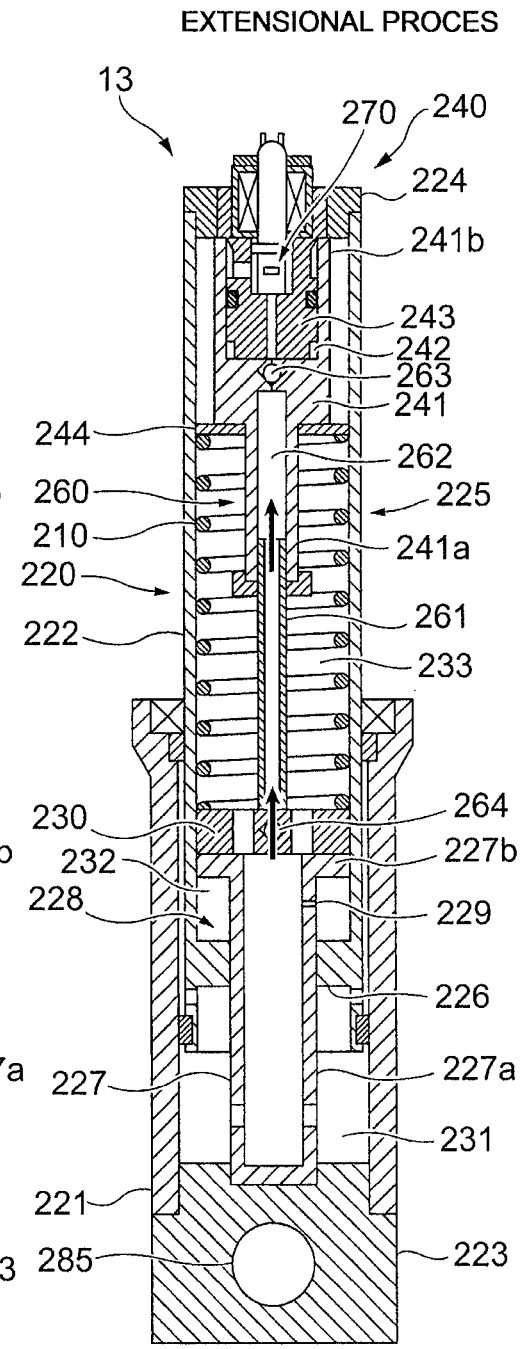

FIGS. 7A and 7B are views describing an operation of the front wheel liquid supply device 260.

When the front fork 13 receives a force caused by concave and convex road surfaces while the motorcycle 1 is travelling, and thus the piston rod 227 enters and retracts from the inner cylinder 222, the pipe 261 enters and retracts from the support member 241 of the front wheel relative position changing device 240. Accordingly, the front wheel liquid supply device 260 with the aforementioned configuration undergoes a pumping operation. When the pump chamber 262 is pressured by the pumping operation, the discharge check valve 263 is opened by liquid in the pump chamber 262, and the liquid is discharged into the jack chamber 242 of the front wheel relative position changing device 240 (refer to FIG. 7A). When a pressure of the pump chamber 262 becomes negative by the pumping operation, the suction check valve 264 is opened by liquid in the oil reservoir chamber 233, and the liquid is suctioned into the pump chamber 262 (refer to FIG. 7B).

The front wheel relative position changing device 240 includes the support member 241 that is disposed in the inner cylinder 222 of the front wheel damper 220, and supports the other end portion (an upper portion in FIGS. 7A and 7B) of the front wheel suspension spring 210 in the centerline direction via a disc-shaped spring receiver 244. The support member 241 has the cylindrical lower cylindrical portion 241$a$ formed in one end portion (a lower portion in FIGS. 7A and 7B) of the support member 241 in the centerline direction, and a cylindrical upper cylindrical portion 241$b$ formed in the other end portion (an upper portion in FIGS. 7A and 7B) of the support member 241 in the centerline direction. The pipe 261 is inserted into the lower cylindrical portion 241$a$.

The front wheel relative position changing device 240 has a hydraulic jack 243 that is fitted into the upper cylindrical portion 241$b$ of the support member 241, and forms the jack chamber 242 along with the support member 241. When the jack chamber 242 is filled with liquid from the cylinder 225, or when liquid is discharged from the jack chamber 242, the support member 241 moves relative to the hydraulic jack 243 in the centerline direction. The head pipe-side attachment portion (not illustrated) is attached to an upper portion of the hydraulic jack 243, and the support member 241 moves relative to the hydraulic jack 243 in the centerline direction. Accordingly, the spring force of the front wheel suspension spring 210 changes, thereby changing a position of the seat 19 relative to the front wheel 14.

The front wheel relative position changing device 240 has a front wheel electromagnetic valve 270 which is an electromagnetic valve (a solenoid valve) provided in a fluid flow path between the jack chamber 242 and the oil reservoir chamber 233. When the front wheel electromagnetic valve 270 is closed, liquid supplied into the jack chamber 242 is reserved in the jack chamber 242. When the front wheel electromagnetic valve 270 is open, the liquid supplied into the jack chamber 242 is discharged into the oil reservoir chamber 233. The front wheel electromagnetic valve 270 will be described in detail later.

Figure 8A:
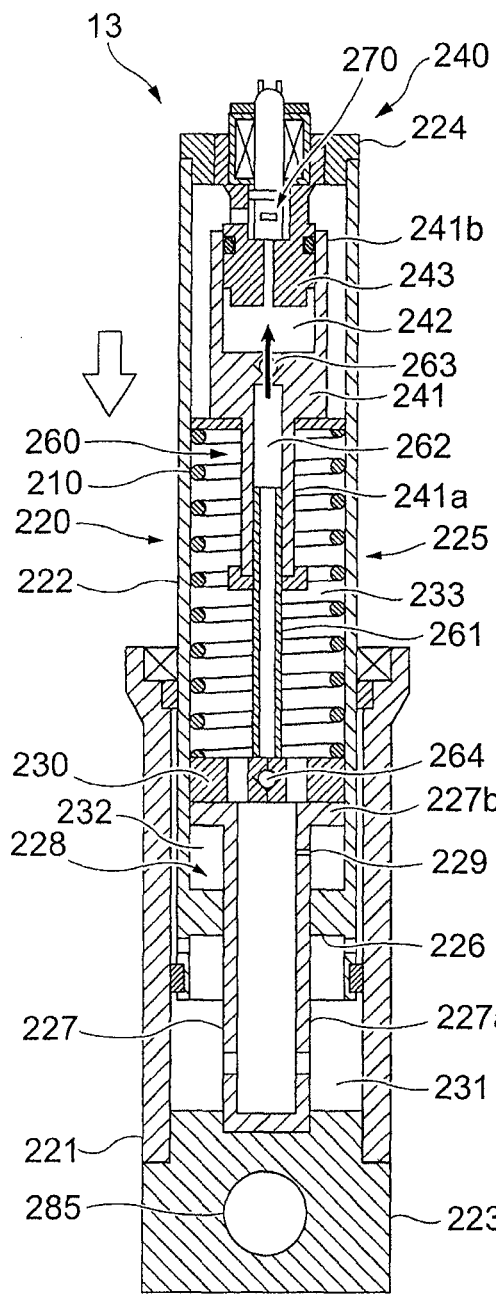
FIGS. 8A and 8B are views describing adjustment of the vehicle height by a front wheel relative position changing device.
Figure 8B:
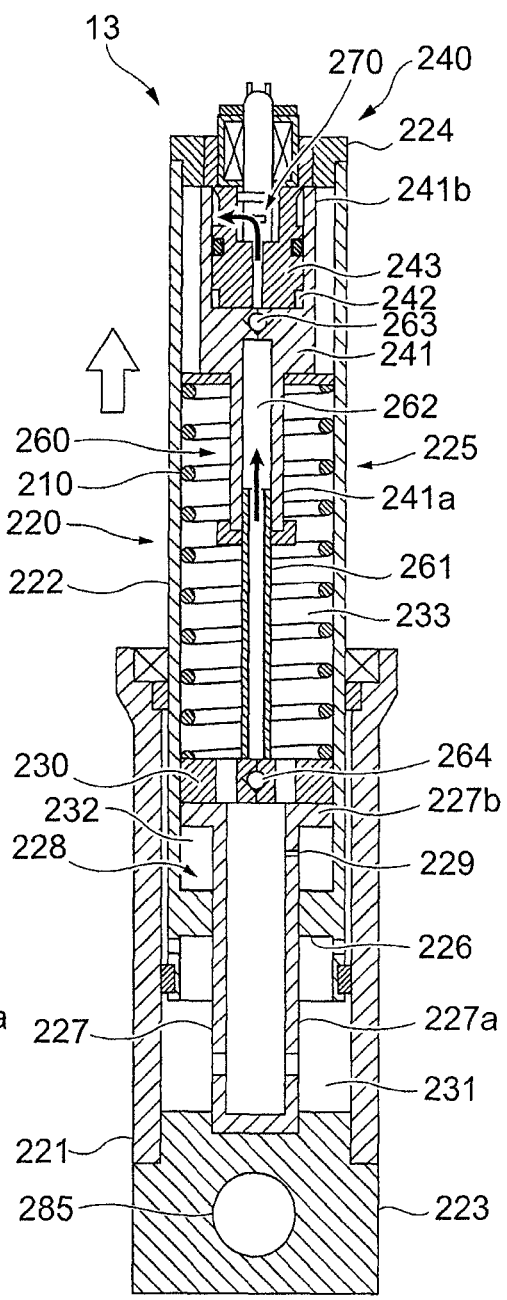

FIGS. 8A and 8B are views describing adjustment of the vehicle height by the front wheel relative position changing device 240.

When the front wheel liquid supply device 260 supplies liquid into the jack chamber 242 in a state in which the front wheel electromagnetic valve 270 is even a little closed from a fully open state, the jack chamber 242 is filled with the liquid, the support member 241 moves toward one end portion (a lower portion in FIG. 8A) of the hydraulic jack 243 in the centerline direction, and the spring length of the front wheel suspension spring 210 becomes shortened (refer to FIG. 8A). In contrast, when the front wheel electromagnetic valve 270 is fully open, the liquid in the jack chamber 242 is discharged into the oil reservoir chamber 233, the support member 241 moves toward the other end portion (an upper portion in FIG. 8B) of the hydraulic jack 243 in the centerline direction, and the spring length of the front wheel suspension spring 210 becomes lengthened (refer to FIG. 8B).

When the support member 241 moves relative to the hydraulic jack 243, and thus the spring length of the front wheel suspension spring 210 becomes shortened, the spring force of the front wheel suspension spring 210 to press the support member 241 increases further compared to when the support member 241 does not move relative to the hydraulic jack 243. As a result, even when a force is exerted toward the front wheel 14 from the vehicle frame 11, an initial load changes, at which a relative position between the front wheel 14 and the vehicle frame 11 does not change. At this time, when the same force is exerted from the vehicle frame 11 (the seat 19) toward one end portion (lower portions in FIGS. 8A and 8B) of the front fork 13 in the centerline direction, the amount of compression (a change in distance between the head pipe-side attachment member (not illustrated) and the vehicle axle-side attachment portion 285) of the front fork 13 decreases. When the support member 241 moves relative to the hydraulic jack 243, and thus the spring length of the front wheel suspension spring 210 becomes shortened, the height of the seat 19 is increased (the vehicle height is increased) further compared to when the support member 241 does not move relative to the hydraulic jack 243. That is, the degree of opening of the front wheel electromagnetic valve 270 decreases, and thus the vehicle height is increased.

In contrast, when the support member 241 moves relative to the hydraulic jack 243, and thus the spring length of the front wheel suspension spring 210 becomes lengthened, the spring force of the front wheel suspension spring 210 to press the support member 241 decreases further compared to when the support member 241 does not move relative to the hydraulic jack 243. At this time, when the same force is exerted from the vehicle frame 11 (the seat 19) toward one end portion (the lower portions in FIGS. 8A and 8B) of the front fork 13 in the centerline direction, the amount of compression (a change in distance between the head pipe-side attachment portion (not illustrated) and the vehicle axle-side attachment portion 285) of the front fork 13 increases. When the support member 241 moves relative to the hydraulic jack 243, and thus the spring length of the front wheel suspension spring 210 becomes lengthened, the height of the seat 19 decreases (the vehicle height decreases) further compared to when the support member 241 does not move relative to the hydraulic jack 243. That is, the vehicle height decreases to the extent that the degree of opening of the front wheel electromagnetic valve 270 increases.

The degree of opening of the front wheel electromagnetic valve 270 is controlled by the control device 50.

When the front wheel electromagnetic valve 270 is open, liquid supplied into the jack chamber 242 may be discharged into the first oil chamber 231 and/or the second oil chamber 232.

Figure 9:
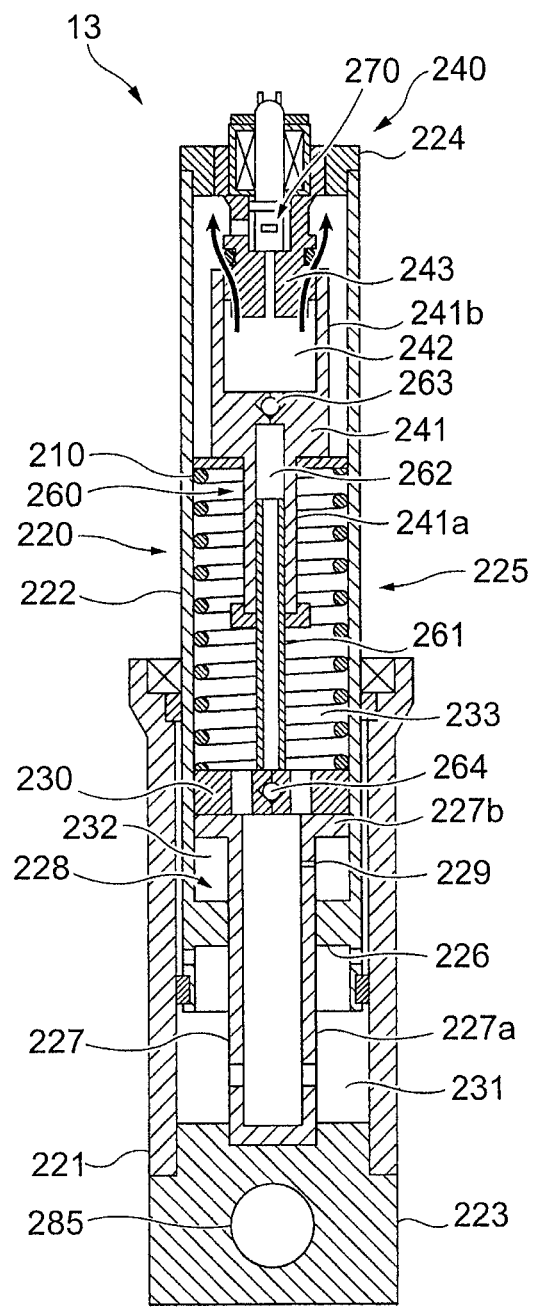
FIG. 9 is a view illustrating a mechanism in which the vehicle height is maintained.

FIG. 9 is a view illustrating a mechanism in which the vehicle height is maintained.

As illustrated in FIG. 9, a return path (not illustrated) is provided in an outer circumferential surface of the hydraulic jack 243. When the support member 241 moves to a predetermined limit position toward one end portion (the lower portions in FIGS. 8A and 8B) of the hydraulic jack 243 in the centerline direction, liquid in the jack chamber 242 returns into the oil reservoir chamber 233 via the return path.

When the front wheel electromagnetic valve 270 is closed, and liquid is continuously supplied into the jack chamber 242, the supplied liquid returns into the oil reservoir chamber 233 via the return path. Accordingly, the position of the support member 241 is maintained relative to the hydraulic jack 243, or the height of the seat 19 (the vehicle height) is maintained.

Hereinafter, when the front wheel electromagnetic valve 270 is fully open, and the amount of movement of the support member 241 relative to the hydraulic jack 243 is the minimum (zero), the state of the front fork 13 is referred to as a minimum state. When the front wheel electromagnetic valve 270 is fully closed, and the amount of movement of the support member 241 relative to the hydraulic jack 243 is the maximum, the state of the front fork 13 is referred to as a maximum state.

The front fork 13 has a front wheel relative position detection unit 295 (refer to FIG. 11). The front wheel relative position detection unit 295 can detect the amount of movement of the support member 241 relative to the hydraulic jack 243 in the centerline direction, or in other words, the amount of movement of the support member 241 relative to the head pipe-side attachment member in the centerline direction. Specifically, coils are wound around an outer circumferential surface in a radial direction of the inner cylinder 222 at a position which corresponds to the support member 241 in the centerline direction, and the support member 241 is formed of a magnetic body. The front wheel relative position detection unit 295 can detect the amount of movement of the support member 241 based on impedance of the coils, which changes according to the movement of the support member 241 relative to the hydraulic jack 243 in the centerline direction.

Subsequently, schematic configurations of the electromagnetic valves will be described: the front wheel electromagnetic valve 270 of the front wheel relative position changing device 240, and the rear wheel electromagnetic valve 170 of the rear wheel relative position changing device 140.

FIG. 10A is a view illustrating the schematic configuration of the front wheel electromagnetic valve 270, and FIG. 10B is a view illustrating the schematic configuration of a rear wheel electromagnetic valve 170.

The front wheel electromagnetic valve 270 is a so-called normally open electromagnetic valve. As illustrated in FIG. 10A, the front wheel electromagnetic valve 270 includes a bobbin 272 around which a coil 271 is wound; a bar-shaped stator core 273 that is fixed to a hollow portion 272a of the bobbin 272; a holder 274 that supports the coil 271, the bobbin 272, and the stator core 273; and a substantially disc-shaped moving core 275 that is disposed to correspond to a tip (an end surface) of the stator core 273, and is drawn toward the stator core 273. The front wheel electromagnetic valve 270 includes a valve body 276 which is fixed to the center of the tip of the moving core 275; a body 277 which is assembled with the holder 274; a valve chamber 278 which is formed in the body 277, and in which the valve body 276 is disposed; a cover member 279 which covers an aperture portion formed in the body 277, and forms the valve chamber 278 along with the body 277; and a coil spring 280 which is disposed between the valve body 276 and the cover member 279. The front wheel electromagnetic valve 270 includes a valve seat 281 which is formed in the body 277, and is disposed in the valve chamber 278 so as to correspond to the valve body 276; an introduction flow path 282 which is formed in the body 277, and through which liquid is introduced into the valve chamber 278 from the jack chamber 242 (refer to FIG. 9); and an output flow path 283 which is formed in the body 277, and through which liquid is output into the oil reservoir chamber 233 from the valve chamber 278 via the valve seat 281. The front wheel electromagnetic valve 270 may be a normally closed electromagnetic valve.

The rear wheel electromagnetic valve 170 is a so-called normally open electromagnetic valve. As illustrated in FIG. 10B, the rear wheel electromagnetic valve 170 includes a bobbin 172 around which a coil 171 is wound; a bar-shaped stator core 173 that is fixed to a hollow portion 172a of the bobbin 172; a holder 174 that supports the coil 171, the bobbin 172, and the stator core 173; and a substantially disc-shaped moving core 175 that is disposed to correspond to a tip (an end surface) of the stator core 173, and is drawn toward the stator core 173. The rear wheel electromagnetic valve 170 includes a valve body 176 which is fixed to the center of the tip of the moving core 175; a body 177 which is assembled with the holder 174; a valve chamber 178 which is formed in the body 177, and in which the valve body 176 is disposed; a cover member 179 which covers an aperture portion formed in the body 177, and forms the valve chamber 178 along with the body 177; and a coil spring 180 which is disposed between the valve body 176 and the cover member 179. The rear wheel electromagnetic valve 170 includes a valve seat 181 which is formed in the body 177, and is disposed in the valve chamber 178 so as to correspond to the valve body 176; an introduction flow path 182 which is formed in the body 177, and through which liquid is introduced into the valve chamber 178 from the jack chamber 142 (refer to FIG. 5); and an output flow path 183 which is formed in the body 177, and through which liquid is output into the liquid reservoir chamber 143a from the valve chamber 178 via the valve seat 181. The rear wheel electromagnetic valve 170 may be a normally closed electromagnetic valve.

In the front wheel electromagnetic valve 270 and the rear wheel electromagnetic valve 170 with the aforementioned configuration, when the coils 271 and 171 are not energized, the moving cores 275 and 175 are respectively biased toward the bottom in FIGS. 10A and 10B by the coil springs 280 and 180, and thus the valve bodies 276 and 176 are not in contact with the valve seats 281 and 181, respectively. The valve bodies 276 and 176 are respectively fixed to the tips (the end surfaces) of the moving cores 275 and 175. For this reason, the introduction flow paths 282 and 182 communicate with the output flow paths 283 and 183, respectively, and the front wheel electromagnetic valve 270 and the rear wheel electromagnetic valve 170 are open. In contrast, in the front wheel electromagnetic valve 270 and the rear wheel electromagnetic valve 170, when the coils 271 and 171 are energized and thus magnetized, the moving cores 275 and 175 are respectively displaced based on balance between an induction force of the stator core 273 and a bias force of the coil spring 280, and balance between an induction force of the stator core 173 and a bias force of the coil spring 180. The front wheel electromagnetic valve 270 and the rear wheel electromagnetic valve 170 adjust positions of the valve bodies 276 and 176 relative to the valve seats 281 and 181, respectively. That is, the front wheel electromagnetic valve 270 and the rear wheel electromagnetic valve 170 adjust the degree of opening of the valves, respectively. The degree of opening of the valves is respectively adjusted by changes in electric power (current and voltage) supplied to the coils 271 and 171.

Subsequently, the control device 50 will be described.

FIG. 11 is a block diagram of a control device 50.

The control device 50 includes a CPU; a ROM that stores a program which is executed by the CPU, various data and the like; a RAM that is used as a CPU's working memory and the like, and an EEPROM which is a non-volatile memory. The control device 50 receives signals output from the front wheel rotation detection sensor 31; the rear wheel rotation detection sensor 32; the front wheel relative position detection unit 295; the rear wheel relative position detection unit 195; and the like.

The control device 50 includes a front wheel rotation speed calculation unit 51 and a rear wheel rotation speed calculation unit 52. The front wheel rotation speed calculation unit 51 calculates a rotation speed of the front wheel 14 based on a signal output from the front wheel rotation detection sensor 31. The rear wheel rotation speed calculation unit 52 that calculates a rotation speed of the rear wheel 21 based on a signal output from the rear wheel rotation detection sensor 32. The front wheel rotation speed calculation unit 51 and the rear wheel rotation speed calculation unit 52 acquire rotation angles of the front wheel 14 and the rear wheel 21 respectively based on pulse signals which are the signals output from the sensors, and then calculate rotation speeds by differentiating the acquired rotation angles over elapsed times.

The control device 50 includes a front wheel movement acquisition unit 53 that acquires a front wheel movement Lf based on a signal output from the front wheel relative position detection unit 295. The front wheel movement Lf is the amount of movement of the support member 241 of the front wheel relative position changing device 240 (refer to FIGS. 8A and 8B) relative to the hydraulic jack 243. The control device 50 includes a rear wheel movement acquisition unit 54 that acquires a rear wheel movement Lr based on a signal output from the rear wheel relative position detection unit 195. The rear wheel movement Lr is the amount of movement of the support member 141 of the rear wheel relative position changing device 140 relative to the hydraulic jack 143. The front wheel movement acquisition unit 53 and the rear wheel movement acquisition unit 54 can acquire the front wheel movement Lf and the rear wheel movement Lr respectively based on respective correlations between the impedance of the coil that is stored in the ROM in advance, and the front wheel movement Lf, and between the impedance of the coil that is stored in the ROM in advance, and the rear wheel movement Lr.

The control device 50 includes a vehicle speed acquisition unit 56 that acquires a vehicle speed Vc, which is a moving speed of the motorcycle 1, based on the rotation speed of the front wheel 14 calculated by the front wheel rotation speed calculation unit 51 and/or the rotation speed of the rear wheel 21 calculated by the rear wheel rotation speed calculation unit 52. The vehicle speed acquisition unit 56 acquires the vehicle speed Vc by calculating a moving speed of the front wheel 14 or a moving speed of the rear wheel 21 based on a front wheel rotation speed Rf or a rear wheel rotation speed Rr. The moving speed of the front wheel 14 can be calculated based on the front wheel rotation speed Rf and the outer diameter of a tire of the front wheel 14. The moving speed of the rear wheel 21 can be calculated based on the rear wheel rotation speed Rr and the outer diameter of a tire of the rear wheel 21. When the motorcycle 1 is normally travelling, it is possible to comprehend that the vehicle speed Vc is equal to the moving speed of the front wheel 14 or the moving speed of the rear wheel 21. The vehicle speed acquisition unit 56 may acquire the vehicle speed Vc by calculating an average moving speed of the front wheel 14 and the rear wheel 21 based on an average value of the front wheel rotation speed Rf and the rear wheel rotation speed Rr.

The control device 50 has an electromagnetic valve controller 57 that controls the degree of opening of the front wheel electromagnetic valve 270 of the front wheel relative position changing device 240 and the degree of opening of the rear wheel electromagnetic valve 170 of the rear wheel relative position changing device 140 based on the vehicle speed Vc acquired by the vehicle speed acquisition unit 56. The electromagnetic valve controller 57 will be described in detail later.

The CPU executes software stored in a storage area such as the ROM so as to realize the front wheel rotation speed calculation unit 51, the rear wheel rotation speed calculation unit 52, the front wheel movement acquisition unit 53, the rear wheel movement acquisition unit 54, the vehicle speed acquisition unit 56, and the electromagnetic valve controller 57.

Subsequently, the electromagnetic valve controller 57 of the control device 50 will be described in detail.

Figure 12:
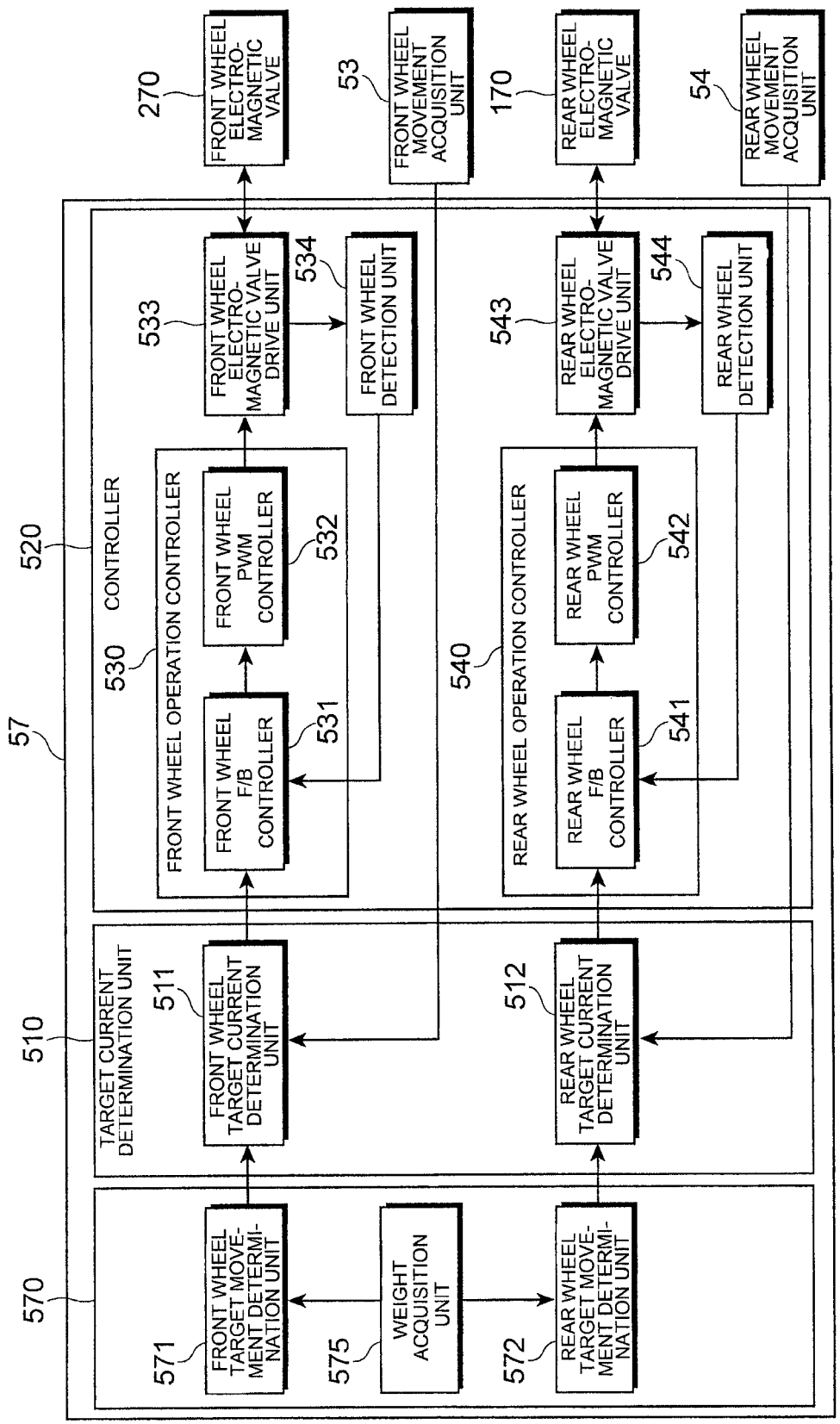
FIG. 12 is a block diagram of an electromagnetic valve controller according to the embodiment.

FIG. 12 is a block diagram of the electromagnetic valve controller 57 according to the embodiment.

The electromagnetic valve controller 57 has a target movement determination unit 570. The target movement determination unit 570 has a front wheel target movement determination unit 571 that determines a front wheel target movement which is a target movement of the front wheel movement Lf; and a rear wheel target movement determination unit 572 that determines a rear wheel target movement which is a target movement of the rear wheel movement Lr; and a weight acquisition unit 575 that acquires the weight exerted on the motorcycle 1 as an example of the vehicle. The electromagnetic valve controller 57 has a target current determination unit 510 and a controller 520. The target current determination unit 510 determines a target current supplied to the front wheel electromagnetic valve 270 of the front wheel relative position changing device 240, and a target current supplied to the rear wheel electromagnetic valve 170 of the rear wheel relative position changing device 140. The controller 520 performs a feedback control based on the target currents determined by the target current determination unit 510.

The target movement determination unit 570 determines a target movement based on the vehicle speed Vc acquired by the vehicle speed acquisition unit 56 (refer to FIG. 11) and the weight exerted on the motorcycle 1 which is acquired by the weight acquisition unit 575.

The weight acquisition unit 575 acquires the weight exerted on the motorcycle 1 based on the weight input via the input device 34 that is provided on the motorcycle 1.

Figure 13:
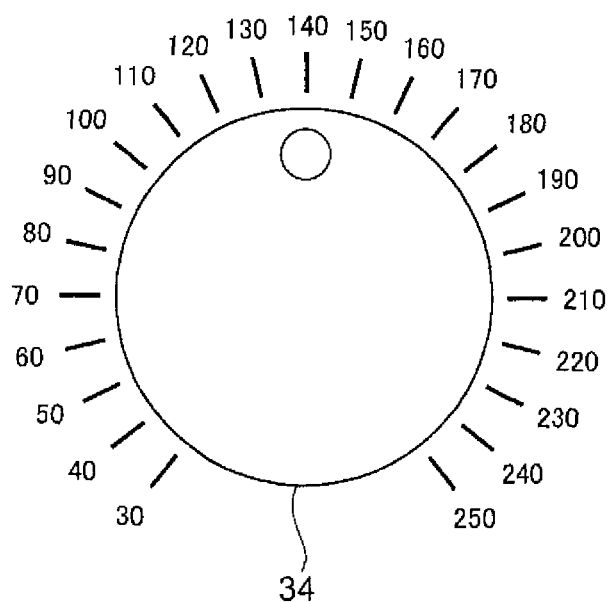
FIG. 13 is an exterior appearance view of an input device.

FIG. 13 is an exterior appearance view of the input device 34.

For example, as illustrated in FIG. 13, the input device 34 is a so-called dial-type device having weight numerals written thereon. A user can select the weight exerted on the motorcycle 1 by rotating a knob of the input device 34. A driver estimates the weight exerted on the motorcycle 1 in consideration of the weight of an occupant on the motorcycle 1 or luggage to be carried by the motorcycle 1, and the driver selects the weight via the input device 34. The weight acquisition unit 575 acquires the weight selected via the input device 34 as the weight exerted on the motorcycle 1. For example, the input device 34 may be provided in the vicinity of a speedometer.

Figure 14A:
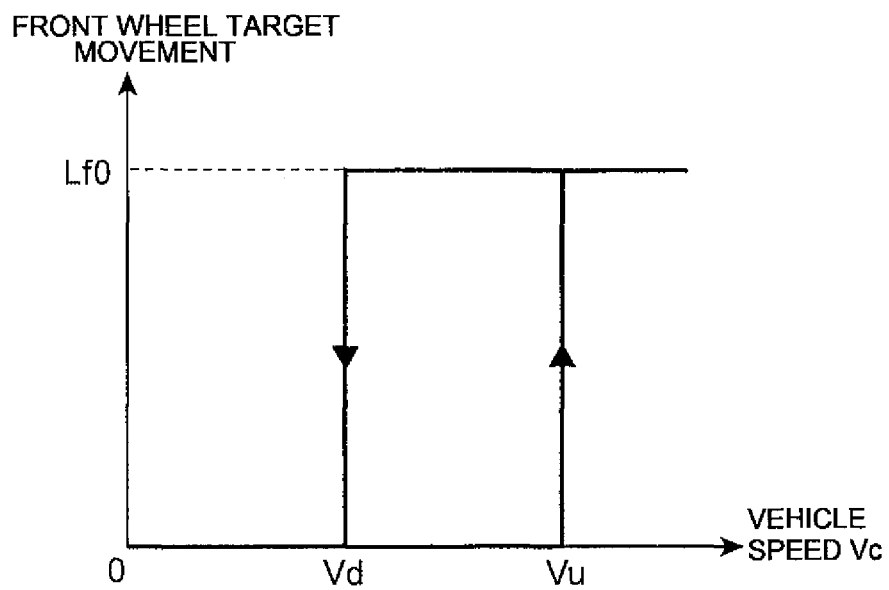
FIG. 14A is a graph illustrating a correlation between a vehicle speed and a front wheel target movement.
Figure 14B:
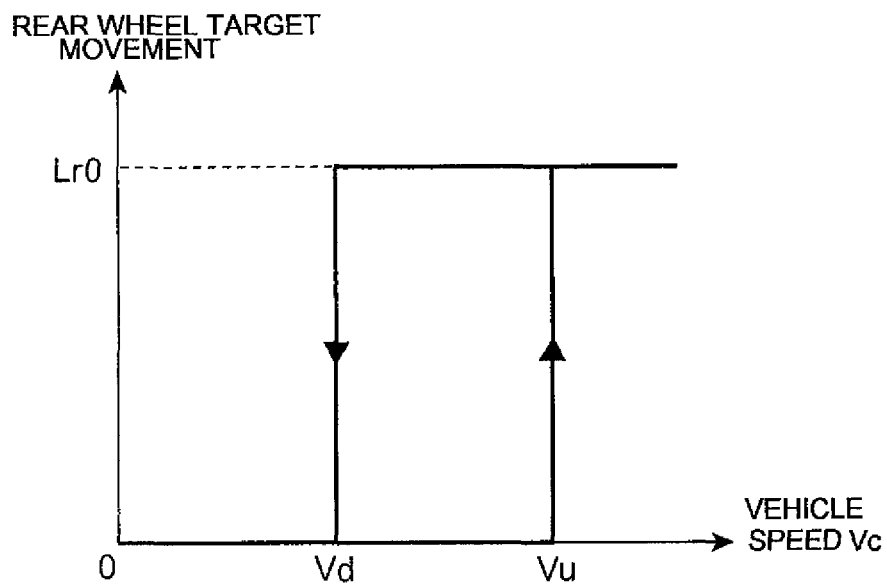
FIG. 14B is a graph illustrating a correlation between the vehicle speed and a rear wheel target movement.

FIG. 14A is a graph illustrating a correlation between the vehicle speed Vc and the front wheel target movement, and FIG. 14B is a graph illustrating a correlation between the vehicle speed Vc and the rear wheel target movement.

Figure 15A:
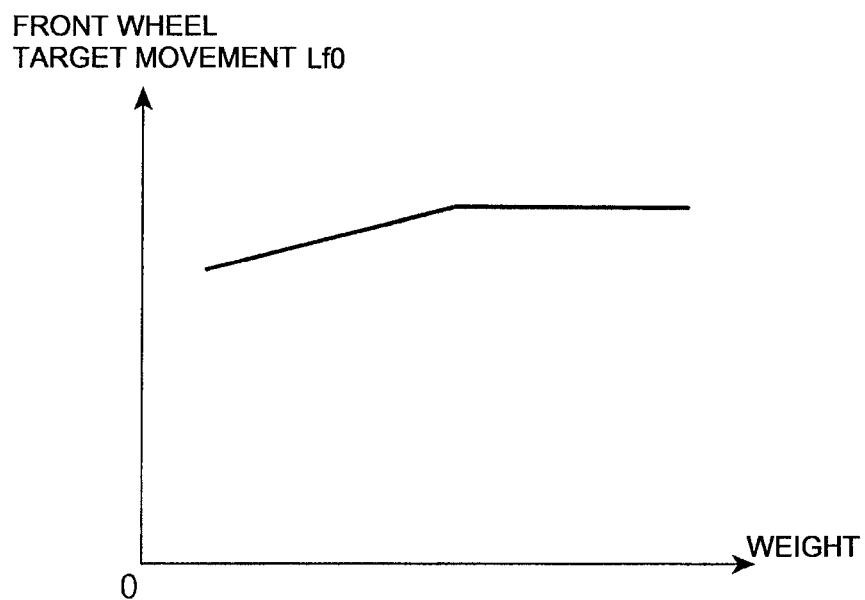
FIG. 15A is a graph illustrating a relationship between a weight exerted on the motorcycle and the front wheel target movement.
Figure 15B:
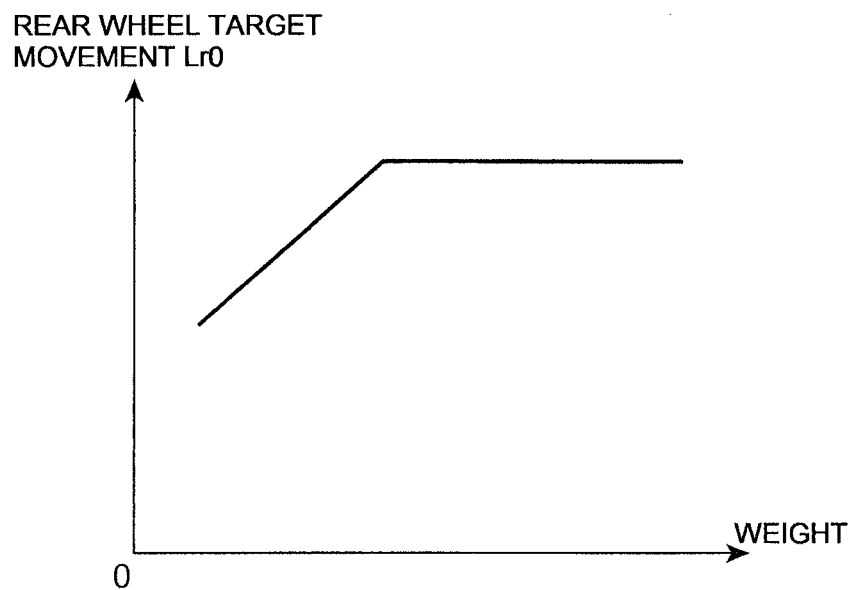
FIG. 15B is a graph illustrating a relationship between the weight exerted on the motorcycle and the rear wheel target movement.

FIG. 15A is a graph illustrating a relationship between the weight exerted on the motorcycle 1 and the front wheel target movement Lf0, and FIG. 15B is a graph illustrating a relationship between the weight exerted on the motorcycle 1 and the rear wheel target movement Lr0.

When the motorcycle 1 begins to travel, and the vehicle speed Vc acquired by the vehicle speed acquisition unit 56 is lower than a predetermined increasing vehicle speed Vu, the target movement determination unit 570 sets the target movement to zero. When the vehicle speed Vc increases from a vehicle speed lower than the increasing vehicle speed Vu to a vehicle speed higher than or equal to the increasing vehicle speed Vu, the target movement determination unit 570 sets the target movement to a value that is determined in advance based on the weight exerted on the motorcycle 1, which is acquired by the weight acquisition unit 575. More specifically, as illustrated in FIG. 14A, when the vehicle speed Vc increases from a vehicle speed lower than the increasing vehicle speed Vu to a vehicle speed higher than or equal to the increasing vehicle speed Vu, the front wheel target movement determination unit 571 sets the front wheel target movement to a predetermined front wheel target movement Lf0 that is determined in advance based on the weight exerted on the motorcycle 1 as illustrated in FIG. 15A. In contrast, as illustrated in FIG. 14B, when the vehicle speed Vc increases from a vehicle speed lower than the increasing vehicle speed Vu to a vehicle speed higher than or equal to the increasing vehicle speed Vu, the rear wheel target movement determination unit 572 sets the rear wheel target movement to a predetermined rear wheel target movement Lr0 that is determined in advance based on the weight exerted on the motorcycle 1 as illustrated in FIG. 15B. Thereafter, while the vehicle speed Vc acquired by the vehicle speed acquisition unit 56 is higher than or equal to the increasing vehicle speed Vu, the front wheel target movement determination unit 571 and the rear wheel target movement determination unit 572 set the front wheel target movement and the rear wheel target movement to the predetermined front wheel target movement Lf0 and the predetermined rear wheel target movement Lr0, respectively. The ROM stores in advance a relationship between a selected position of the input device 34 and the weight exerted on the motorcycle 1, a relationship between the weight exerted on the motorcycle 1 and the front wheel target movement Lf0 as illustrated in FIG. 15A, and a relationship between the weight exerted on the motorcycle 1 and the rear wheel target movement Lr0 as illustrated in FIG. 15B. Since the vehicle height of the motorcycle 1 is determined based on the front wheel movement Lf and the rear wheel movement Lr, the front wheel target movement Lf0 and the rear wheel target movement Lr0 can be determined in advance based on the weight (a selected position of the input device 34) exerted on the motorcycle 1 in such a manner that the vehicle height becomes equal to a predetermined desired vehicle height, and the predetermined front wheel target movement Lf0 and the pretermined rear wheel target movement Lr0 can be stored in the ROM.

In contrast, when the travelling speed of the motorcycle 1 decreases from a vehicle speed higher than or equal to the increasing vehicle speed Vu to a vehicle speed lower than or equal to a predetermined decreasing vehicle speed Vd, the target movement determination unit 570 sets the target movement to zero. That is, the front wheel target movement determination unit 571 and the rear wheel target movement determination unit 572 set the front wheel target movement and the rear wheel target movement to zero, respectively. It is possible to illustrate 10 km/h and 8 km/h for the increasing vehicle speed Vu and the decreasing vehicle speed Vd, respectively.

Even in a case in which the vehicle speed Vc acquired by the vehicle speed acquisition unit 56 is higher than the decreasing vehicle speed Vd, when the motorcycle 1 decelerates rapidly due to the sudden application of a brake and the like, the target movement determination unit 570 sets the target movement to zero. That is, the front wheel target movement determination unit 571 and the rear wheel target movement determination unit 572 set the front wheel target movement and the rear wheel target movement to zero, respectively. The fact that the motorcycle 1 undergoes a rapid deceleration can be acquired based on whether the amount of reduction of the vehicle speed Vc acquired by the vehicle speed acquisition unit 56 per unit time is less than or equal to a predetermined value.

The target current determination unit 510 has a front wheel target current determination unit 511 and a rear wheel target current determination unit 512. The front wheel target current determination unit 511 determines a front wheel target current based on the front wheel target movement determined by the front wheel target movement determination unit 571. The front wheel target current is a target current of the front wheel electromagnetic valve 270. The rear wheel target current determination unit 512 determines a rear wheel target current based on the rear wheel target movement determined by the rear wheel target movement determination unit 572. The rear wheel target current is a target current of the rear wheel electromagnetic valve 170.

For example, the front wheel target current determination unit 511 determines the front wheel target current by substituting the front wheel target movement, which is determined by the front wheel target movement determination unit 571, into a corresponding map between the front wheel target movement and the front wheel target current, and which is prepared based on an empirical rule and is stored in the ROM in advance.

For example, the rear wheel target current determination unit 512 determines the rear wheel target current by substituting the rear wheel target movement, which is determined by the rear wheel target movement determination unit 572, into a corresponding map between the rear wheel target movement and the rear wheel target current, and which is prepared based on an empirical rule and is stored in the ROM in advance.

When the front wheel target movement and the rear wheel target movement are equal to zero, the front wheel target current determination unit 511 and the rear wheel target current determination unit 512 set the front wheel target current and the rear wheel target current to zero, respectively. In a state in which the front wheel target current and the rear wheel target current are determined to be zero, when the front wheel target movement and the rear wheel target movement which are respectively determined by the front wheel target movement determination unit 571 and the rear wheel target movement determination unit 572, change from zero to values other than zero, or in other words, when the vehicle height begins to be increased from a state of not being increased, the front wheel target current determination unit 511 and the rear wheel target current determination unit 512 set the front wheel target current and the rear wheel target current, respectively, based on the front wheel target movement and the rear wheel target movement which are respectively determined by the front wheel target movement determination unit 571 and the rear wheel target movement determination unit 572. When the front wheel electromagnetic valve 270 is a normally closed electromagnetic valve, and the front wheel target movement is equal to zero, it is necessary to energize the front wheel electromagnetic valve 270. When the rear wheel electromagnetic valve 170 is a normally closed electromagnetic valve, and the rear wheel target movement is equal to zero, it is necessary to energize the rear wheel electromagnetic valve 170.

When the front wheel target current determination unit 511 determines the front wheel target current based on the front wheel target movement determined by the front wheel target movement determination unit 571, the front wheel target current determination unit 511 may perform a feedback control based on a deviation between the front wheel target movement determined by the front wheel target movement determination unit 571 and the actual front wheel movement Lf acquired by the front wheel movement acquisition unit 53 (refer to FIG. 11), and the front wheel target current determination unit 511 may determine the front wheel target current. Similarly, when the rear wheel target current determination unit 512 determines the rear wheel target current based on the rear wheel target movement determined by the rear wheel target movement determination unit 572, the rear wheel target current determination unit 512 may perform a feedback control based on a deviation between the rear wheel target movement determined by the rear wheel target movement determination unit 572 and the actual rear wheel movement Lr acquired by the rear wheel movement acquisition unit 54 (refer to FIG. 11), and the rear wheel target current determination unit 512 may determine the rear wheel target current.

The controller 520 has a front wheel operation controller 530 that controls an operation of the front wheel electromagnetic valve 270; a front wheel electromagnetic valve drive unit 533 that drives the front wheel electromagnetic valve 270; and a front wheel detection unit 534 that detects an actual current flowing through the front wheel electromagnetic valve 270. The controller 520 has a rear wheel operation controller 540 that controls an operation of the rear wheel electromagnetic valve 170; a rear wheel electromagnetic valve drive unit 543 that drives the rear wheel electromagnetic valve 170; and a rear wheel detection unit 544 that detects an actual current flowing through the rear wheel electromagnetic valve 170.

The front wheel operation controller 530 has a front wheel feedback (F/B) controller 531 and a front wheel PWM controller 532. The front wheel feedback controller 531 performs a feedback control based on a deviation between the front wheel target current determined by the front wheel target current determination unit 511 and an actual current (an actual front wheel current) detected by the front wheel detection unit 534. The front wheel PWM controller 532 performs PWM control of the front wheel electromagnetic valve 270.

The rear wheel operation controller 540 has a rear wheel feedback (F/B) controller 541 and a rear wheel PWM controller 542. The rear wheel feedback controller 541 performs a feedback control based on a deviation between the rear wheel target current determined by the rear wheel target current determination unit 512 and an actual current (an actual rear wheel current) detected by the rear wheel detection unit 544. The rear wheel PWM controller 542 performs PWM control of the rear wheel electromagnetic valve 170.

The front wheel feedback controller 531 obtains a deviation between the front wheel target current and an actual front wheel current detected by the front wheel detection unit 534, and performs a feedback control in such a manner that the deviation becomes zero. The rear wheel feedback controller 541 obtains a deviation between the rear wheel target current and an actual rear wheel current detected by the rear wheel detection unit 544, and performs a feedback control in such a manner that the deviation becomes zero. For example, the front wheel feedback controller 531 can perform a proportional process and an integral process on the deviation between the front wheel target current and the actual front wheel current by using a proportional element and an integral element, respectively. The rear wheel feedback controller 541 can perform a proportional process and an integral process on the deviation between the rear wheel target current and the actual rear wheel current by using a proportional element and an integral element, respectively. The processed values can be added by an addition calculation unit. Alternatively, for example, the front wheel feedback controller 531 can perform a proportional process, an integral process and a differential process on the deviation between the front wheel target current and the actual front wheel current by using a proportional element, an integral element and a differential element, respectively. The rear wheel feedback controller 541 can perform a proportional process, an integral process and a differential process on the deviation between the rear wheel target current and the actual rear wheel current by using a proportional element, an integral element and a differential element, respectively. The processed values can be added by the addition calculation unit.

The front wheel PWM controller 532 changes a duty ratio (=t/T×100(%)) of a pulse width (t) to a certain period (T), and performs PWM control of the degree of opening (a voltage applied to the coil of the front wheel electromagnetic valve 270) of the front wheel electromagnetic valve 270. When the PWM control is performed, a pulse-shaped voltage is applied to the coil of the front wheel electromagnetic valve 270 based on the duty ratio. At this time, a current flowing through the coil 271 of the front wheel electromagnetic valve 270 cannot trace the applied pulse-shaped voltage due to the impedance of the coil 271, and an output of the current is dull. The current flowing through the coil of the front wheel electromagnetic valve 270 increases and decreases proportionally to the duty ratio. For example, when the front wheel target current is equal to zero, the front wheel PWM controller 532 can set the duty ratio to zero, and when the front wheel target current is equal to the maximum current or a first target current A1 which will be described later, the front wheel PWM controller 532 can set the duty ratio to 100%.

Similarly, the rear wheel PWM controller 542 changes a duty ratio, and performs PWM control of the degree of opening (a voltage applied to the coil of the rear wheel electromagnetic valve 170) of the rear wheel electromagnetic valve 170. When the PWM control is performed, a pulse-shaped voltage is applied to the coil 171 of the rear wheel electromagnetic valve 170 based on the duty ratio, and a current flowing through the coil 171 of the rear wheel electromagnetic valve 170 increases and decreases proportionally to the duty ratio. For example, when the rear wheel target current is equal to zero, the rear wheel PWM controller 542 can set the duty ratio to zero, and when the rear wheel target current is equal to the maximum current or a second target current A2 which will be described later, the rear wheel PWM controller 542 can set the duty ratio to 100%.

For example, the front wheel electromagnetic valve drive unit 533 includes a transistor (FET) as a switching element that is connected between a positive line of a power supply and the coil of the front wheel electromagnetic valve 270. The front wheel electromagnetic valve drive unit 533 controls the driving of the front wheel electromagnetic valve 270 by driving a gate of the transistor and causing the transistor to undergo a switching operation. For example, the rear wheel electromagnetic valve drive unit 543 includes a transistor that is connected between a positive line of the power supply and the coil of the rear wheel electromagnetic valve 170. The rear wheel electromagnetic valve drive unit 543 controls the driving of the rear wheel electromagnetic valve 170 by driving a gate of the transistor and causing the transistor to undergo a switching operation.

The front wheel detection unit 534 detects an actual current flowing through the front wheel electromagnetic valve 270 from a voltage occurring between opposite ends of a shunt resistance that is connected to the front wheel electromagnetic valve drive unit 533. The rear wheel detection unit 544 detects an actual current flowing through the rear wheel electromagnetic valve 170 from a voltage occurring between opposite ends of a shunt resistance that is connected to the rear wheel electromagnetic valve drive unit 543.

In the motorcycle 1 with the aforementioned configuration, the electromagnetic valve controller 57 of the control device 50 determines the target current based on the target movement associated with the weight exerted on the motorcycle 1, and performs PWM control in such a manner that actual currents supplied to the front wheel electromagnetic valve 270 and the rear wheel electromagnetic valve 170 become equal to the determined target currents. That is, the front wheel PWM controller 532 and the rear wheel PWM controller 542 of the electromagnetic valve controller 57 change the duty ratios, and thus control electric power supplied to the coil 271 of the front wheel electromagnetic valve 270 and the coil 171 of the rear wheel electromagnetic valve 170, respectively, and control the front wheel electromagnetic valve 270 and the rear wheel electromagnetic valve 170 to open to an arbitrary degree of opening, respectively. Accordingly, when the control device 50 controls upper limits of the amount of liquid (oil) flowing into the jack chamber 242 and the jack chamber 142 by controlling the degree of opening of the front wheel electromagnetic valve 270 and the rear wheel electromagnetic valve 170, the control device 50 can change the target movements to the target movements which are determined based on the weight exerted on the motorcycle 1 as illustrated in FIGS. 15A and 15B. In the relationship between the weight exerted on the motorcycle 1 and the target movement illustrated in FIGS. 15A and 15B, as the weight becomes larger, the front wheel target movement Lf0 and the rear wheel target movement Lr0 become larger. Therefore, as the weight exerted on the motorcycle 1 becomes larger, an initial load of each of the front wheel suspension spring 210 and the rear wheel suspension spring 110 becomes larger. When the weight exerted on the motorcycle 1 is large, the front fork 13 and the rear suspension 22 are unlikely to be compressed. In contrast, when the weight exerted on the motorcycle 1 is small, the front fork 13 and the rear suspension 22 are likely to be compressed. It is possible to adjust the vehicle height to a desired height regardless of the weight exerted on the motorcycle 1. As a result, even when the weight of a driver is heavy, or two occupants get on the motorcycle 1, or luggage is heavy, it is possible to adjust the vehicle height to a desired height while the vehicle is travelling, and thus it is possible to improve ride comfort or travelling stability. The front wheel PWM controller 532 and the rear wheel PWM controller 542 of the electromagnetic valve controller 57 may control the front wheel electromagnetic valve 270 and the rear wheel electromagnetic valve 170, respectively, in such a manner that the detected movements coincide with the target movements. At this time, the front wheel PWM controller 532 and the rear wheel PWM controller 542 determine the target currents based on the target movements and the detected movements, respectively.

In the embodiment, when the motorcycle 1 begins to travel, and the vehicle speed Vc acquired by the vehicle speed acquisition unit 56 increases from a vehicle speed lower than the increasing vehicle speed Vu to a vehicle speed higher than or equal to the increasing vehicle speed Vu, or when the motorcycle 1 begins to travel, and the vehicle speed Vc decreases from a vehicle speed higher than or equal to the increasing vehicle speed Vu to a vehicle speed lower than or equal to the decreasing vehicle speed Vd, the target movement determination unit 570 sets the target movement to zero. However, the present invention is not limited to the embodiment. The minimum target movement may not be set to zero, and instead, the minimum target movement may be determined based on the weight exerted on the motorcycle 1.

Figure 16A:
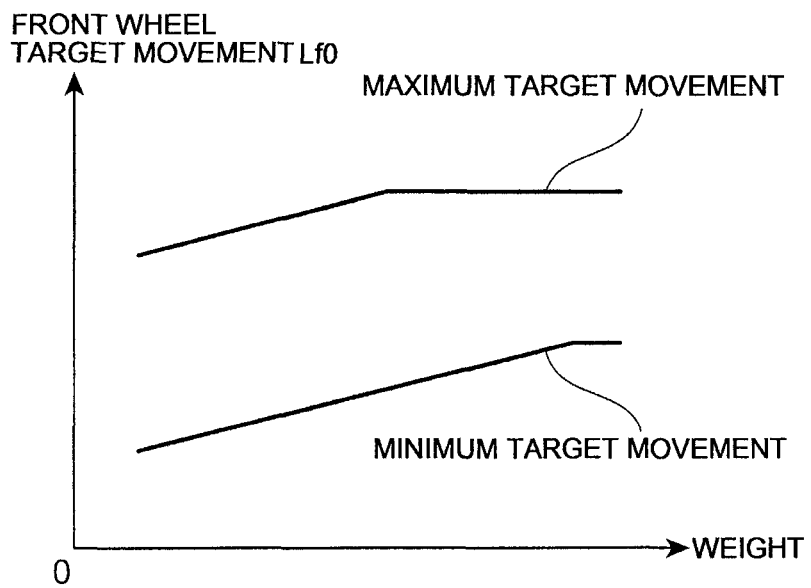
FIG. 16A is a graph illustrating a relationship between the weight exerted on the motorcycle and the front wheel target movement.
Figure 16B:
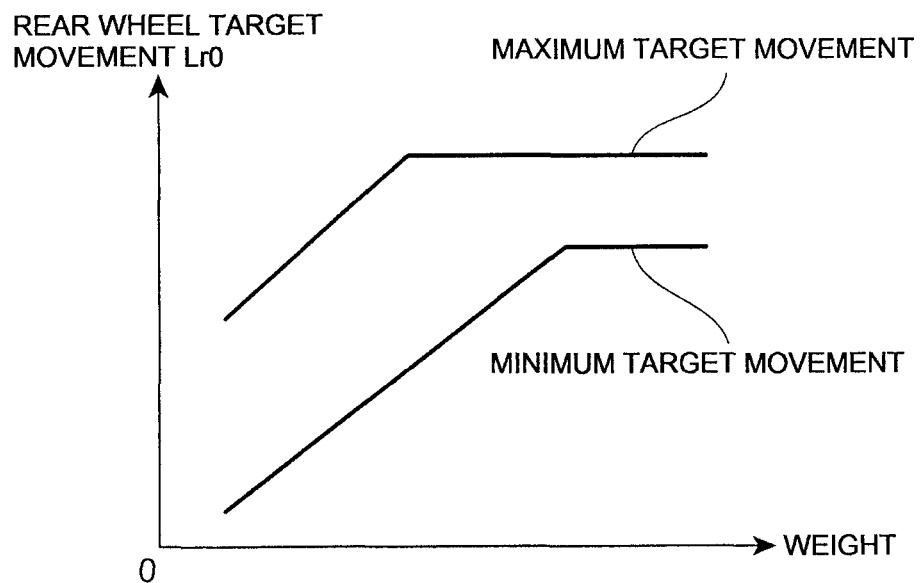
FIG. 16B is a graph illustrating a relationship between the weight exerted on the motorcycle and the rear wheel target movement.

FIG. 16A is a graph illustrating a relationship between the weight exerted on the motorcycle 1 and the front wheel target movement Lf0, and FIG. 16B is a graph illustrating a relationship between the weight exerted on the motorcycle 1 and the rear wheel target movement Lr0.

FIG. 16A illustrates the maximum target movement and the minimum target movement of the front wheel target movement Lf0, and FIG. 16B illustrates the maximum target movement and the minimum target movement of the rear wheel target movement Lr0. The maximum target movement of the front wheel target movement Lf0 illustrated in FIG. 16A is a movement equivalent to the front wheel target movement Lf0 illustrated in FIG. 15A. The maximum target movement of the rear wheel target movement Lr0 illustrated in FIG. 16B is a movement equivalent to the rear wheel target movement Lr0 illustrated in FIG. 15B.

When the motorcycle 1 begins to travel, and the vehicle speed Vc is lower than the increasing vehicle speed Vu, or when the motorcycle 1 begins to travel, and the vehicle speed Vc decreases from a vehicle speed higher than or equal to the increasing vehicle speed Vu to a vehicle speed lower than or equal to the decreasing vehicle speed Vd, the target movement determination unit 570 sets the target movements to the minimum target movements based on the weight exerted on the motorcycle 1 as illustrated in FIGS. 16A and 16B. In other words, when the control device 50 controls lower limits of the amount of liquid (oil) flowing into the jack chamber 242 and the jack chamber 142 by controlling the degree of opening of the front wheel electromagnetic valve 270 and the rear wheel electromagnetic valve 170, the control device 50 can change the minimum target movements to the target movements which are determined based on the weight exerted on the motorcycle 1 as illustrated in FIGS. 16A and 16B. Accordingly, while the vehicle is travelling at a low speed, the control device 50 can adjust the vehicle height to a desired height regardless of the weight exerted on the motorcycle 1. As a result, even when the weight of a driver is heavy, two occupants get on the motorcycle 1, or luggage is heavy, it is possible to adjust the vehicle height to a desired height while the vehicle is travelling at a low speed, and thus it is possible to improve ride comfort or travelling stability.

Modification Example 1

In the embodiment, a so-called dial-type device is adopted as the input device 34. However, the present invention is not limited to the embodiment. Insofar as a user can select the weight exerted on the motorcycle 1, the input device 34 may be a lever-type device in which the user linearly moves a knob, a switch-type device in which the user presses a button for the weight, or a touch panel-type device in which the user presses a display on a screen so as to input the weight.

Modification Example 2

In the embodiment, the weight acquisition unit 575 acquires the weight exerted on the motorcycle 1 based on the weight input via the input device 34 that is provided on the motorcycle 1. However, the present invention is not limited to the embodiment.

For example, a weight sensor may be provided in the seat 19 of the motorcycle 1, and the weight acquisition unit 575 may acquire the weight exerted on the motorcycle 1 based on the weight detected by the weight sensor. When the vehicle speed Vc is lower than the increasing vehicle speed Vu before the vehicle height begins to be increased, the weight acquisition unit 575 can acquire the weight exerted on the motorcycle 1 based on the value detected by the weight sensor.

For example, the weight acquisition unit 575 may acquire the weight exerted on the motorcycle 1 dependent on a changing speed of the amount of movement determined based on the front wheel movement Lf and the rear wheel movement Lr when a predetermined period of time elapses after the vehicle height begins to be increased from a state of not being increased.

Modification Example 3

When electric power is not supplied to the control device 50, for example, the engine 17 of the motorcycle 1 is stopped, the EEPROM or the like may store the weight exerted on the motorcycle 1, which is acquired at a startup, and the weight acquisition unit 575 may read the stored weight at the next startup.

Modification Example 4

Each correlation between the weight exerted on the motorcycle 1 and the target movement, which is stored in the ROM as illustrated in FIGS. 15A, 15B, 16A, and 16B, may undergo an offset correction for the motorcycle 1 after the front fork 13 and the rear suspension 22 are attached to the motorcycle 1. Accordingly, it is possible to correct a variation of each of the front fork 13 and the rear suspension 22.

What is claimed is:

1. A vehicle height adjustment apparatus comprising:
   a spring that is disposed between a body of a vehicle and a tire wheel of the vehicle;
   a damper that undergoes an extensional and contractional operation so as to move working oil to dampen vibration of the spring;
   a support member that supports one end portion of the spring, and moves relative to the damper to change a length of the spring;
   a working oil chamber into which the working oil causing the support member to move relative to the damper flows by the extensional and contractional operation of the damper;
   an electromagnetic valve that adjusts an amount of the working oil flowing into the working oil chamber by a degree of opening of the electromagnetic valve; and
   a control unit that controls the degree of opening of the electromagnetic valve based on a weight exerted on the vehicle.

2. The vehicle height adjustment apparatus according to claim 1,
   wherein the control unit changes upper and lower limits of the amount of working oil flowing into the working oil chamber based on the weight exerted on the vehicle.

* * * * *